3,108,694
SYSTEM FOR COLLATING DOCUMENTS IN RESPONSE TO INDICIA APPEARING THEREON
Norman R. Crain and Jay G. Levinthal, Sunnyvale, William G. Facenda, Los Altos, and Theodore H. Vea, Palo Alto, Calif., assignors to General Electric Company, a corporation of New York
Filed Sept. 14, 1959, Ser. No. 839,836
20 Claims. (Cl. 209—111.5)

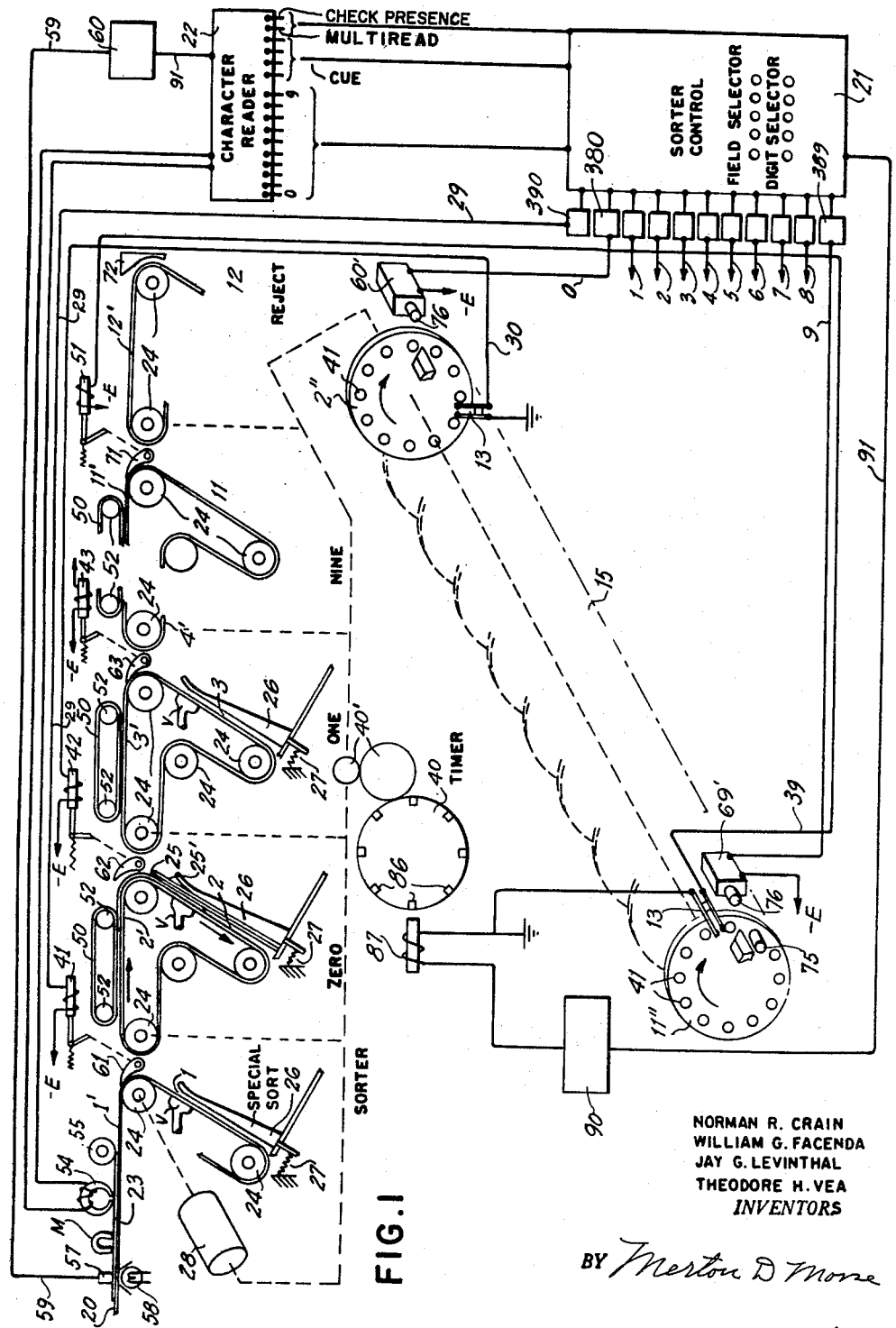

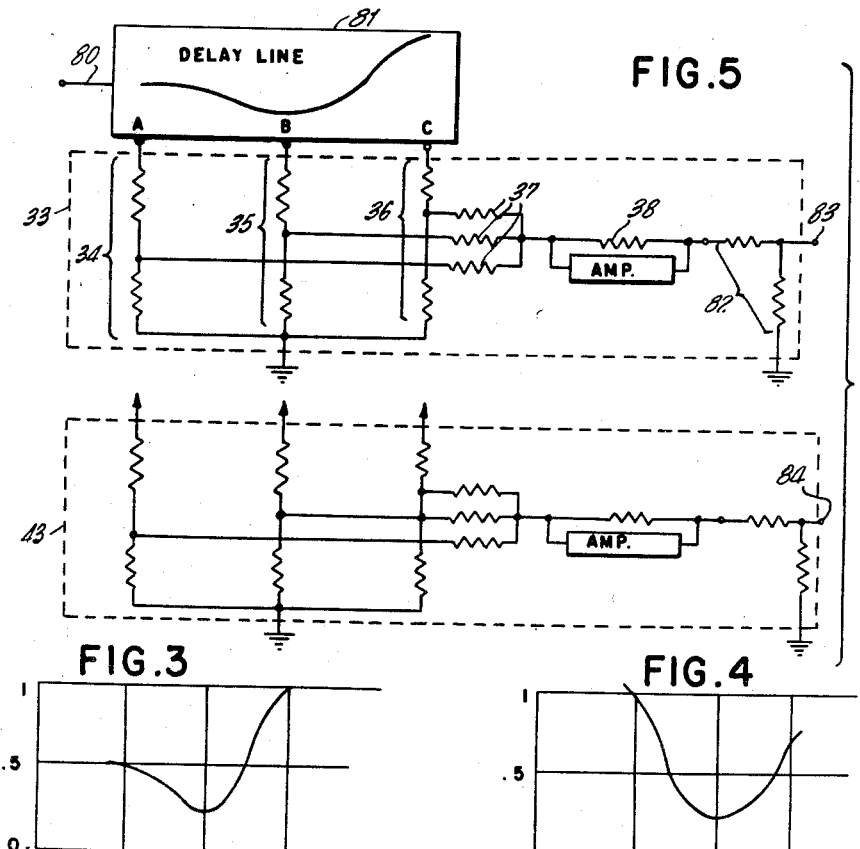

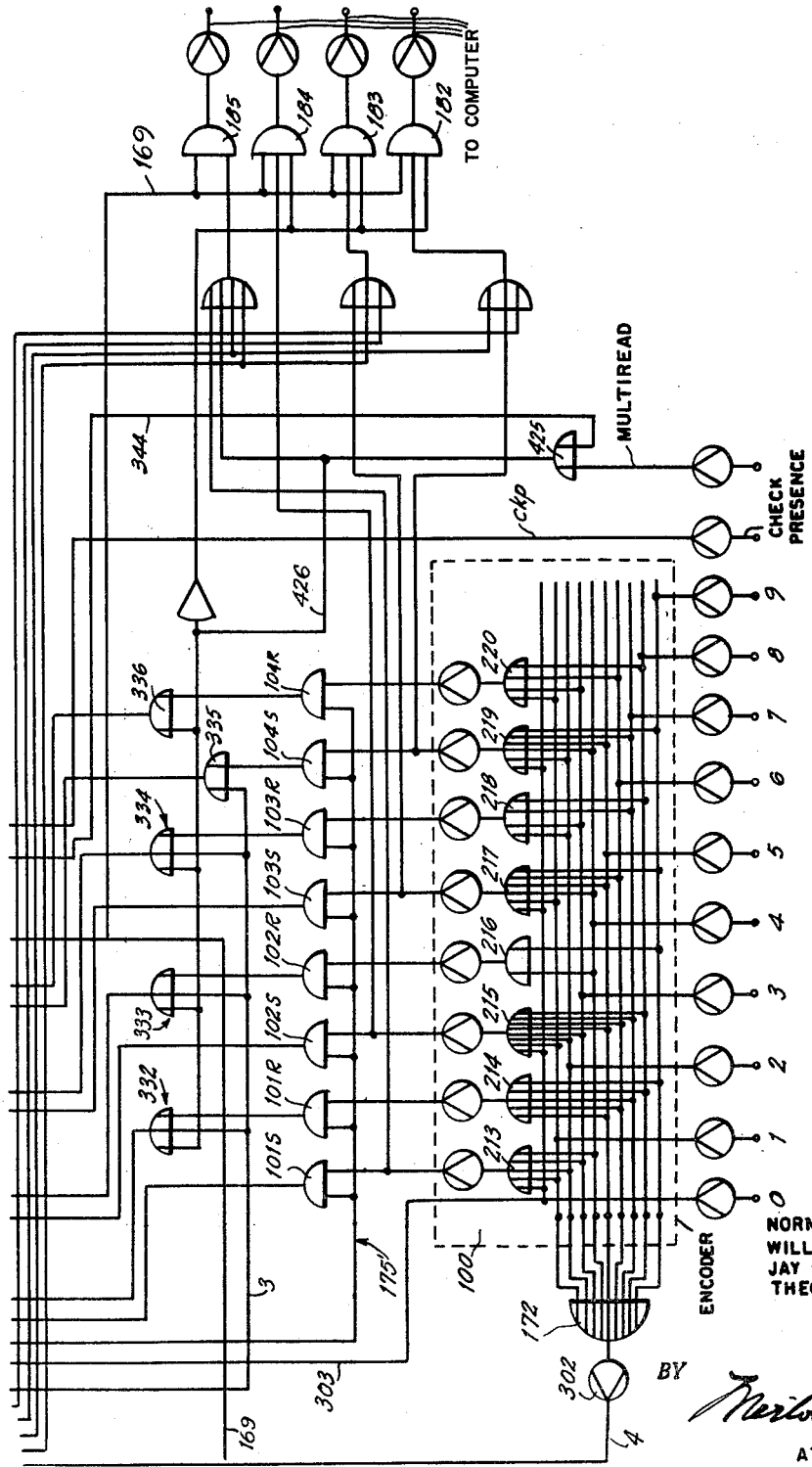

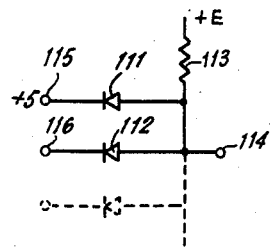
FIG.14
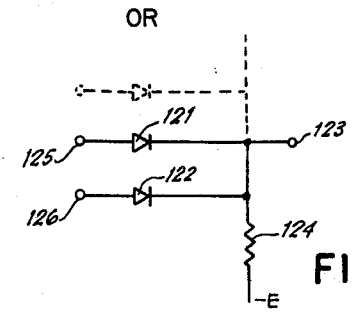
FIG.15
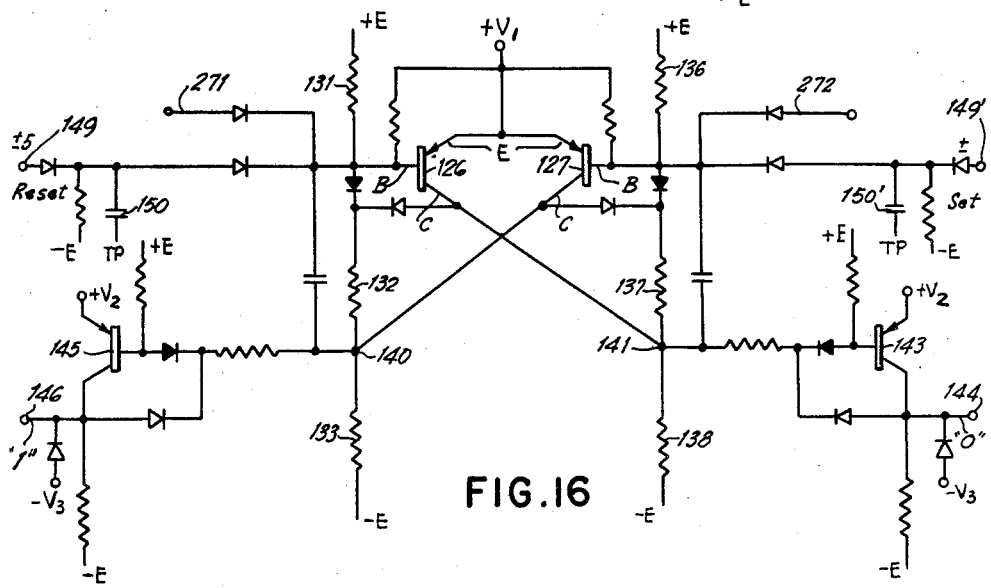
FIG.16
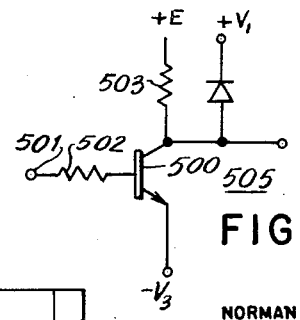
FIG.19
FIG.7 | FIG.8 | FIG.9
FIG.11
FIG.10
NORMAN R. CRAIN
WILLIAM G. FACENDA
JAY G. LEVINTHAL
THEODORE H. VEA
INVENTORS

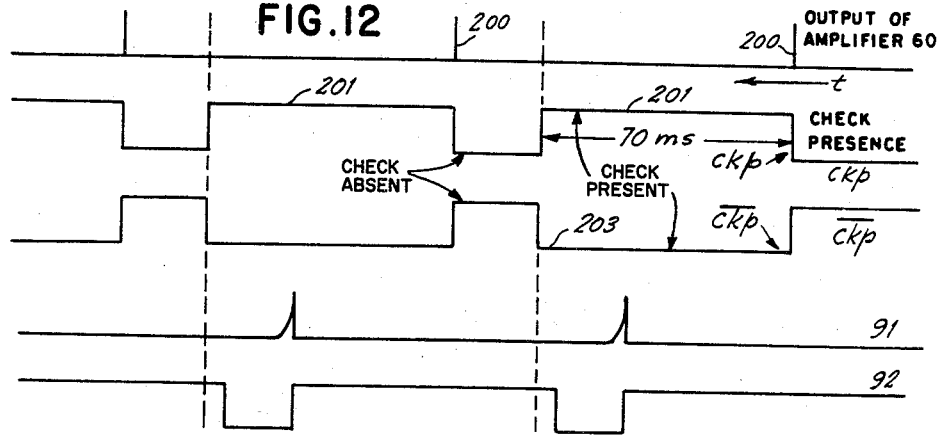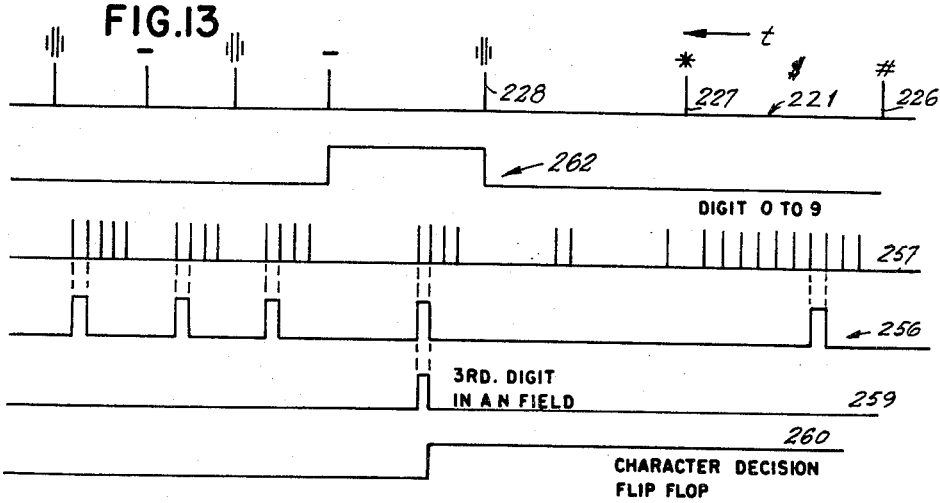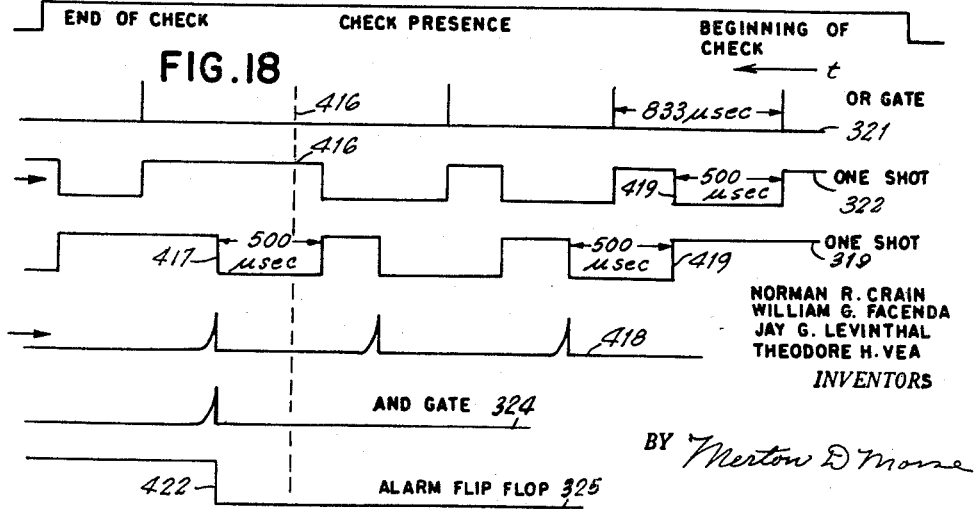

Our invention relates to systems for collating documents. It has for one of its objects to provide a system for collating documents in response to, and in accord with, indicia printed on the documents themselves.

While our invention has many applications of utility it is particularly adapted for the collation of documents in a banking operation. One of the substantial items of expense in a banking operation, as in many other operations, is the sorting, collating, or classifying, of documents. An object of our invention is to provide means to perform such operations by machine, automatically, in response to, and in accord with, printing on the documents themselves, thereby to reduce such items of expense.

In a banking operation the documents principally to be collated are checks, deposit slips, and similar documents. In accord with our invention, when such documents are received by the bank, the bank prints thereon, in magnetizable ink indicia indicative of the processing, treatment, or routing, the document is to receive.

For example, these indicia may indicate, in one field of the document the dollar amount involved; in a second field, the type of transaction to be accorded the document such as pay, deposit, or hold, etc.; a third field, the account number involved, and the bank holding the account, and in a fourth field, the routing of the document. These fields may be printed in alignment across the check so that the documents may be passed rapidly through the collating machine, the indicia in each field of each document being scanned in succession to produce voltages in the output of the scanning device by which the documents are collated.

To effect such operation each field of the document is preceded by a desired symbol, or cue character. All of the indicia and symbols, cue characters, produce characteristic waves in the output of the scanner. A Character Reader then converts these waves to pulses in as many output circuits as there are indicia and cue characters. Since ordinarily the indicia are numerals from zero to nine the Character Reader has as many output conductors as there are numerals and cue characters. Each numeral and cue character produces a pulse in a corresponding output circuit.

As the document passes through the machine on a suitable conveyor it passes the entry ports of a plurality of pockets, at least, one for each numeral, and others for such special purposes as may be required. The entrance to these pockets is controlled in response to these pulses to cause each document to be deposited in a pocket corresponding to an indicia read by the Character Reader.

One of the objects of our invention is to provide such a system which is practical, economical, rapid in operation, and readily adapted to the sorting of documents.

Another object of our invention is to provide control means responsive to the pulses produced by the Character Reader, and which operates in accord with conditions set up by the operator to collate documents in accord with the numerals in a selected digit position of any selected field on the document.

Another object of our invention is to provide means to segregate from the documents passed through the machine those documents on which the printing is either missing, or such that the Character Reader cannot definitely and reliably produce corresponding pulses by which the documents may be collated into desired final categories. Such documents according to our invention are collected into a Reject pocket.

Another object of our invention is to provide means whereby the machine distinguishes indicia having significance on the document from the same indicia in positions where it has no significance, and effects collation in response to the significant indicia while assigning documents bearing such insignificant indicia to a special category.

The novel features which we believe to be characteristic of our invention are set forth with particularity in the appended claims. Our invention itself, however, both as to its organization and method of operation, together with further objects and advantages thereof, may best be understood by reference to the following description taken in connection with the accompanying drawing in which:

FIG. 1 indicates a conventionalized representation of an embodiment of our invention with greater detail as to the mechanical structure thereof.

FIG. 2 represents a typical document with respect to which our invention finds utility.

FIGS. 3 and 4 represent certain wave forms produced in the pickup 54 by indicia on the document.

FIG. 5 illustrates typical circuits of the Character Reader.

FIGS. 7, 8, 9, and 10 taken together according to the plan illustrated in FIG. 11 show in greater detail the circuits of the Sorter Control.

FIG. 12 shows certain wave relationship relating particularly to FIG. 1.

Figure 7:
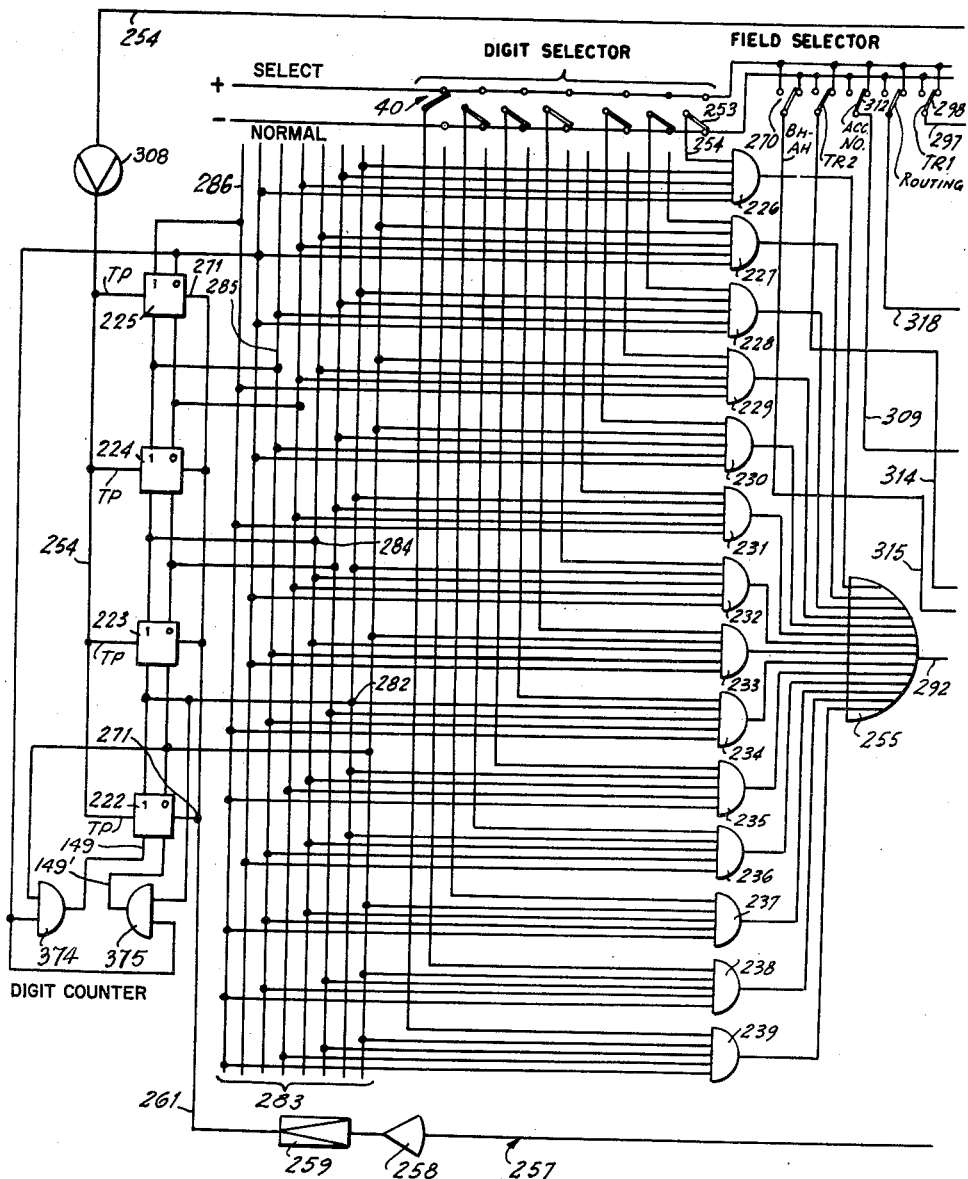
Figure 8:
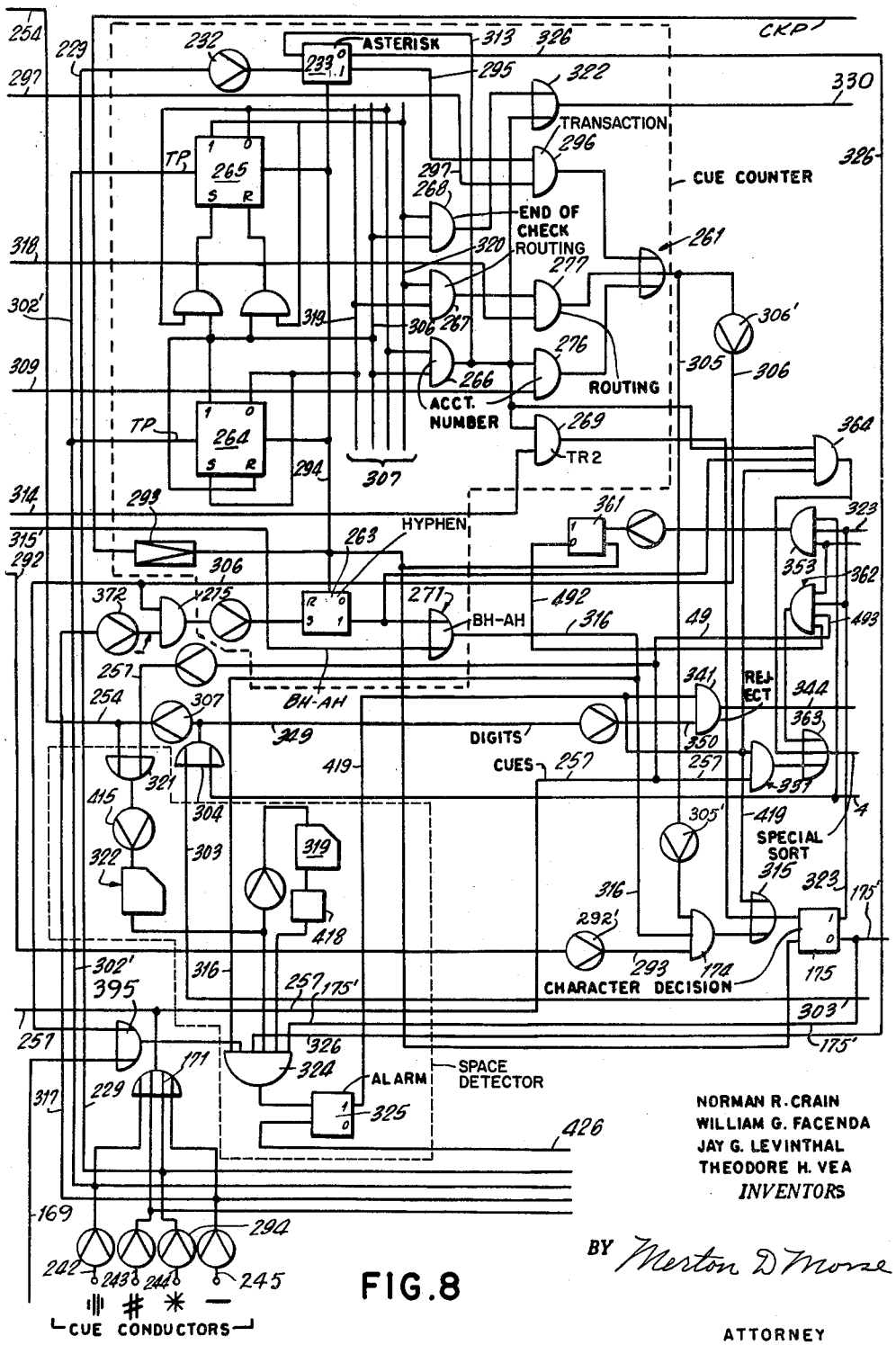

FIG. 13 shows certain wave formation pertaining more particularly to FIGS. 7 and 8.

FIG. 14 shows the circuit of an AND gate as used in our invention.

FIG. 15 shows the circuit of an OR gate as hereinafter commonly referred to.

FIG. 16 shows one circuit of a flip flop that may be employed.

FIG. 17 shows a modified format which may be used on document to be collated by our invention.

FIGURE 18 shows certain characteristics relating to the space detector of our invention.

FIG. 19 illustrates a common emitter reset amplifier of a type useful in connection with the flip flop of FIGURE 16.

FIG. 1 shows, very conventionally, an embodiment of our invention with greater particularity as to the mechanical structure thereof. It comprises the mechanical structure, which bears the legend SORTER on the drawing, by which documents to be collated are conveyed from a entry point 20 into pockets designated on the drawing 1, 2, 3, . . . 11, 12. This is in accord with, and in response to, indicia appearing on the documents themselves.

The documents are conveyed through the Sorter by endless belts 1', 2', 3', . . . 11', 12', under control of Sorter Control 21 shown in the lower right-hand portion of the drawing. The operation of the Sorter Control 21 is controlled by a Character Reader 22 shown in the upper right-hand portion of the drawing, this Character Reader being itself controlled by a pick-up device 54, which responds to indicia printed on the documents to be collated.

The control of the Sorter by the Sorter Control 21 is effected through a timer 15 having a plurality of disks 2″ to 11″, which operate a plurality of pairs of contacts 13, one pair for each disk. These contacts are connected through conductors 30 to 39 to control solenoids 42 to 51, which operate deflectors 62 to 71 in the path of the documents thereby to direct the passage of any desired document into a pocket 2 to 11 in accord with commands of the Sorter Control.

A deflector 61 controlled by the Sorter Control may also be operated in response to operations by the operator, to be hereinafter explained, to deflect documents into the first pocket of the Sorter which is sometimes referred to as the Special Sort pocket since it is used for special purposes which will be explained. This control is effected over conductor 29 without going through the timer 15.

The endless belts 1′ to 12′ operate over suitable pulleys 24 arranged in any suitable configuration to convey documents 23 from one belt to the next in succession until the document meets an open deflector 61, 62, 63, . . . 71, 72, which deflects the document into a pocket as indicated by the particular document 25 which is shown entering the pocket 2, the pocket comprising the space between the downwardly moving belt, and a parallel plate 26. The belt, as it enters the pocket, is provided with holes and a vacuum cup V at its back side, the vacuum within which causes the document to adhere to the belt as it enters the pocket. The plate 26 is lightly pressed against the belt in any suitable way as by means which, for simplicity of the drawing, is represented as a bias spring 27. As checks are added one after another in the pocket, the plate 26 is forced outward against its bias but yieldably holds the checks in parallel order in the pocket, as shown at 25′.

In the event that none of the deflectors 61, 62, 63, . . . 71, are open as a document is conveyed along the line, it finally engages stationary deflector 72, which deflects it into pocket 12. This pocket is sometimes hereinafter referred to as the "Reject" pocket.

All of the guide pulleys 24 are positively driven by means of a synchronous motor 28, which also drives a timing disk 40 through suitable gears 40′. It also drives the nine disks of the timer 15 all of which are arranged on the same shaft.

In order to assure the positive control and movement of the documents along the length of the endless belts, each belt is provided with a cooperating belt 50, which operates about idler pulleys 52, which belts bear upon the upper surface of the documents to bear them positively into engagement with the belts 2′—3′, etc. Similarly a roller 55 is employed in connection with the first belt 1′.

The control of the documents and their distribution into the various pockets 1 to 12 is effected in accord with certain indicia printed in alignment on the documents in magnetic ink, the presence and form of which indicia is detected by a magnetic pick-up head 54, which supplies to the Character Reader 22 wave forms corresponding to the individual indicia.

The documents enter the sorter at point 20, after having passed through previous apparatus, not shown, by which their movement and spacing are appropriately synchronized and adjusted with respect to the movement of the sorter. The entry of a document into the sorter is first detected by a photo electric cell 57, positioned above the belt 1′, when light produced by a source 58 below the belt is interrupted by the document passing along the belt. The belt may comprise a plurality of parallel strips of belt with the light beam passing between the strips. This interruption of the light beam between the source 58 and the photo electric cell 57 produces a variation in current in conductor 59, which is amplified by amplifier 60 and initiates a timing interval, to be referred to hereinafter, within the Character Reader 22 and provides a check presence signal for the Sorter Control.

Thereafter the document advances to a point where the magnetic ink of the indicia is magnetized by a permanent magnet M and thereafter the magnetically polarized indicia pass underneath the pick-up head 54, which responds to the magnetized indicia to produce pulses having wave forms characteristic of the particular indicia.

FIG. 2 shows one form of document used in a banking operation, and which bears indicia useful in accord with our invention. In such an operation ordinary commercial checks, or deposit slips, comprise the classes of documents principally to be collated. FIG. 2 shows the format of such a check having printed near the lower edge thereof a series of indicia representative of indicia that may be used in accord with our invention. These indicia comprise the number sign 62′, the asterisk 63′, French doors 64′, and hyphens 65′. These indicia indicate fields on the check used for different purposes in the collation of the documents by the system here described.

The first field comprises numerals which correspond to the dollar amount of the check and is designated "Dollar Amount" in FIG. 2. This field is used more particularly when the Sorter Control is operated to supply data to a processor and to receive pocket commands from the same processor. Such operation is hereinafter termed "On Line" operation.

The next field following the asterisk comprises numerals, or indicia, indicating a "Transaction Code" such as "Hold," "Deposit," or "Pay."

The next field, which follows the first French door 64′ has numerals corresponding to the depositor's "Account Number." This field may be divided into two parts by the hyphen 65′, the numerals after the hyphen identifying the bank which has the account and the numerals before the hyphen identifying the account.

Similarly, the next field, which follows the second French door, is designated "Routing" indicative of the branch, or associated bank, or other routing, through which the document is to be transmitted.

The Character Reader 22 is capable of distinguishing between all of these different indicia. The indicia 62′, 63′, 64′, 65′ are known as cue indicia, and are used to designate the field following the respective indicia. In response to the number sign 62, FIG. 2, the Character Reader produces a pulse on the corresponding one of the four conductors designated CUE on the Character Reader as shown on the drawing, FIG. 1. In response to the asterisk the Character Reader produces a pulse on a different one of the four cue conductors. In response to the french doors the Character Reader produces a pulse upon a third one of the four cue conductors, and in response to the hyphen the Character Reader produces a pulse on the fourth of the cue conductors.

Similarly, each of the numerals 0 to 9, which may appear in any of the fields, causes the Character Reader to produce a pulse in the corresponding one of the conductors 0 to 9 on the Character Reader as illustrated on FIG. 1 of the drawing.

The conductors 0 to 9 and the four cue conductors are all connected to the Sorter Control to transmit pulses so produced to control the Sorter Control.

The Character Reader has two additional output conductors designated "Multiple Read" and "Check Presence," the purpose of which will be indicated later.

The Sorter Control is provided with two sets of push buttons, one designated "Field Selector" and the other "Digit Selector." By operating a field selector button corresponding to one of the fields, which is designated by one of the cue characters, the operator causes the equipment to select a particular field corresponding to the button operated. Similarly, by operating a Digit Selector, he may cause the equipment to respond to the pulses produced by the numeral in the selected digit of the selected field. Thus, for example, if he pushes the button corresponding to the Account Number field and the number 3 digit button, the equipment responds only to the numerals in the third digit of the Account Number field. Thus in the check shown on FIG. 2 the third digit is the numeral 9. Thus a pulse will appear in output conductor 9 from the Sorter Control, and the check will be deposited in the pocket controlled by that conductor.

If, for example, the next check scanned by the pick-up device 54 has the numeral 2 in the third digit of the Account Number, a pulse will appear on conductor number 2, and the check will be deposited in the pocket controlled by that conductor.

The pulses in the ouput conductors 0 to 9 of the Sorter Control operate through the timer 15 to control the solenoids 42 to 51, to operate the deflectors 62 to 71 in proper time relation to direct the different documents into the pockets corresponding to the numeral in the third digit of the Account Number field.

Of course, had a different field or a different digit numeral been selected, the checks would be directed into pockets corresponding to the numerals in the respective digit of the selected field.

In this way the operator may collate in the different pockets of the sorter all checks sorted, each pocket receiving checks have the same numeral in the digit on which sorting is effected. In the "Reject" pocket will be found checks having imperfect printing, or printing that does not adequately accord with the intended format. In the Special Sort pocket will be found other checks of special categories later to be explained.

The manner in which the timing of the operation of the deflectors is effected is as follows. The timer 15 comprises ten disks 2" to 11", only two of which are shown on the drawing. The disks 2"–11" are on a common shaft which is driven at such a speed that it makes one complete revolution during the time required for a check to travel the length of the pocket assembly. Each of these 10 disks have about their periphery 12 apertures, indicated by circles 41 on the drawing, each aperture containing a pin 75, which normally projects outward on the right side of the disk, as the disk is shown on the drawing. Cooperating with each disk is a hammer 76 operated by respective solenoids, 60' to 69'. These solenoids are connected in the respective output conductors 0 to 9 of the Sorter Control. Thus upon appearance of a pulse in any of the conductors 0 to 9 a corresponding solenoid 60' to 69' is operated causing its hammer 76 to advance to the left, driving the pin 75 to the left through the disk so that it projects forward from the disk on the opposite side. The pin 75 in disk 11" is shown in the advanced position as in response to a pulse in conductor 9 at the output of the Sorter Control.

Upon rotation of the disks 11", this pin 75, at a point in its rotation, engages corresponding contacts 13, causing a circuit to be closed to the corresponding one of solenoids 42 to 51. For example, the operation of the solenoid 51 causes the deflector 71 to be lifted for an instant sufficient to admit the check having the numeral 9 in its third digit of the Account Number field, into pocket 11 provided the third digit in the Account Number field had been selected by the push buttons.

It will now be observed that had the number 9 occurred in the selected digit of one check and the immediately following check had the number 0, or 1, in the selected digit, the first check must travel the entire length of the 9 endless belts to deflector 71 before it is deposited in the pocket 11, whereas the immediately following check must be deposited in the number 1 pocket. Thus, the second check referred to must be deposited in its pocke before the first check arrives at deflector 71.

For this reason the contacts 13 associated with disk 2" to 11" are spaced at progressively greater angles fron hammer 76 about the periphery of the disks. Thus, th contacts 13 associated with disk 2" are spaced from th hammer 76 by a very small angle and are closed shortl after pin 75 has been set by the hammer. On the othe hand, the contacts 13 associated with disk 11" are space about the disk from hammer 76 by nearly the complet circumference of the disk 11". Thus these contacts wil be closed after a considerable longer interval after the re spective pin 75 has been set by the hammer 76. Thes time intervals are so adjusted by the spacing of the con tacts 11 about the respective disks that deflectors 61 to 7 are operated just in time to admit to the correspondin pockets any check having the corresponding numeral i the selected digit. It also returns to its normal positio after such a check has been admitted to the pocket an before the arrival of the next check.

Preferably, in operation, these deflectors are positively driven both in opening the pocket and in closing it, th action being only initiated, or triggered, by the actuatin solenoid. For simplicity of illustration on the drawin the deflectors are shown as actuated upward by th solenoids and downward by spring bias.

Also, in operation, the pulses in the output conductor: 0 to 9 of the Sorter Control are accurately timed wit respect to the position of the check entering the sorter This is effected by the timing disk 40, which is mechan ically driven by the motor 28, which drives the belts 1 to 12' and the timer 15. This disk 40 has equally space about its periphery a plurality of magnetic slugs 86 which upon rotation of the disk induce pulses in a coi 87 adjacent the periphery. The spacing of this coil 8 about the periphery of the disk relative to the positio of the entering check on belt 1' is such that each pulse occurs as the check attains a predetermined distanc from the first pocket. This pulse is supplied to the Sorte Control and triggers the pulses in the output circuits ( to 9 of the Sorter Control, which operates the timer t open the pockets at the right instant to admit the differen checks to the proper pockets. In a sense these pulse: serve as notice from the timer to the Sorter Control tha it is ready to receive a further command from the Sorte Control, which it will dispatch in proper time to th sorter.

THE CHARACTER READER

The Character Reader shown in FIG. 1 of the drawin may be of the type shown and described in United State: Patent 2,924,812 entitled "Automatic Reading System," and United States application Serial Number 783,350 filed by P. E. Merritt and C. M. Steele December 29 1958 and entitled "Spurious Signal Suppression in Auto matic Signal Reader," which patent application is assigne to the assignee of our present application.

In general, however, the structure and operation of thi Character Reader is as follows:

The pick-up device 54 produces in its output a wav form corresponding to the particular numeral scanned by it. For example, one numeral may produce a wave forn shown in FIG. 3 and another numeral may produce th wave form shown in FIG. 4. These wave forms are supplied to the input terminal 80 of a lossless delay lin 81, shown in FIG. 5. A number of taps A, B, and C spaced along the line are connected to ground, or othe point of reference potential, by means of voltage divider: 34, 35, and 36 an intermediate point on each of thes voltage dividers being connected through respective re sistors 37 and common resistor 38, which may be shunte by an amplifier, to voltage divider 82, an intermediat point 83 of which, may be connected to the desired load In understanding the method of proportioning the di vider networks 34, 35, 36 and 82, let us assume that th wave form of FIG. 3 appears on the network 81 as indicated by the curve shown within the rectangle designated by the network 81. This may be referred to as the sampling position. At a particular instant it will lie on the network as indicated by the latter curve. Let us assume that the maximum voltage which may be taken as unity appears at the point C, that a quarter of this voltage appears at point B and that half of this voltage appears at point A. Then the voltage divider 34 is proportioned to supply half of the voltage at point A through resistor 38 to the voltage divider 82. The divider 35 is proportioned to supply a quarter of the voltage at point B to the divider 82, and the divider 36 is proportioned to supply the whole voltage at the point C to the divider 82. The divider 82 is proportioned in accordance with the inverse of the square root of the sum of the squares of these ratios.

Similarly, a second network 43 is also connected between points A, B, and C, and ground, as shown in the lower portion of FIG. 5, this network being proportioned in accordance with the same relationship between the division factor and the relative amplitude observed at the tap points when the wave corresponding to this network is in the sampling position in delay line 81. Similarly, additional networks may be connected between the points A, B, and C, and ground, one for each indicia to be recognized by the system. When any one of the wave forms conditioning the proportioning of the networks 33, 43, etc. in accordance with the foregoing instructions is now applied to the delay line, that one of the terminals 83, 84, etc. connected to the network designed to recognize that particular wave will produce a larger output with the wave in sampling position than observed from the output of any other such wave recognizing network. Through the use of a proper threshold device it may be determined whether the difference between the largest output amplitude and the next largest output amplitude is adequate to insure the desired reliability, guaranteeing against a multiple read. Each of these conductors 83, and 84, and others as may be desired, may be connected through suitable amplifiers and a threshold device to the conductors 0 to 9 and the cue conductors of FIG. 1. The threshold device eliminates from conductors 0 to 9 outputs other than those that exceed the threshold, i.e. those that are produced by a wave form not corresponding to the circuit in which the output pulse appears.

THE SORTER CONTROL—GENERAL

Figure 6:
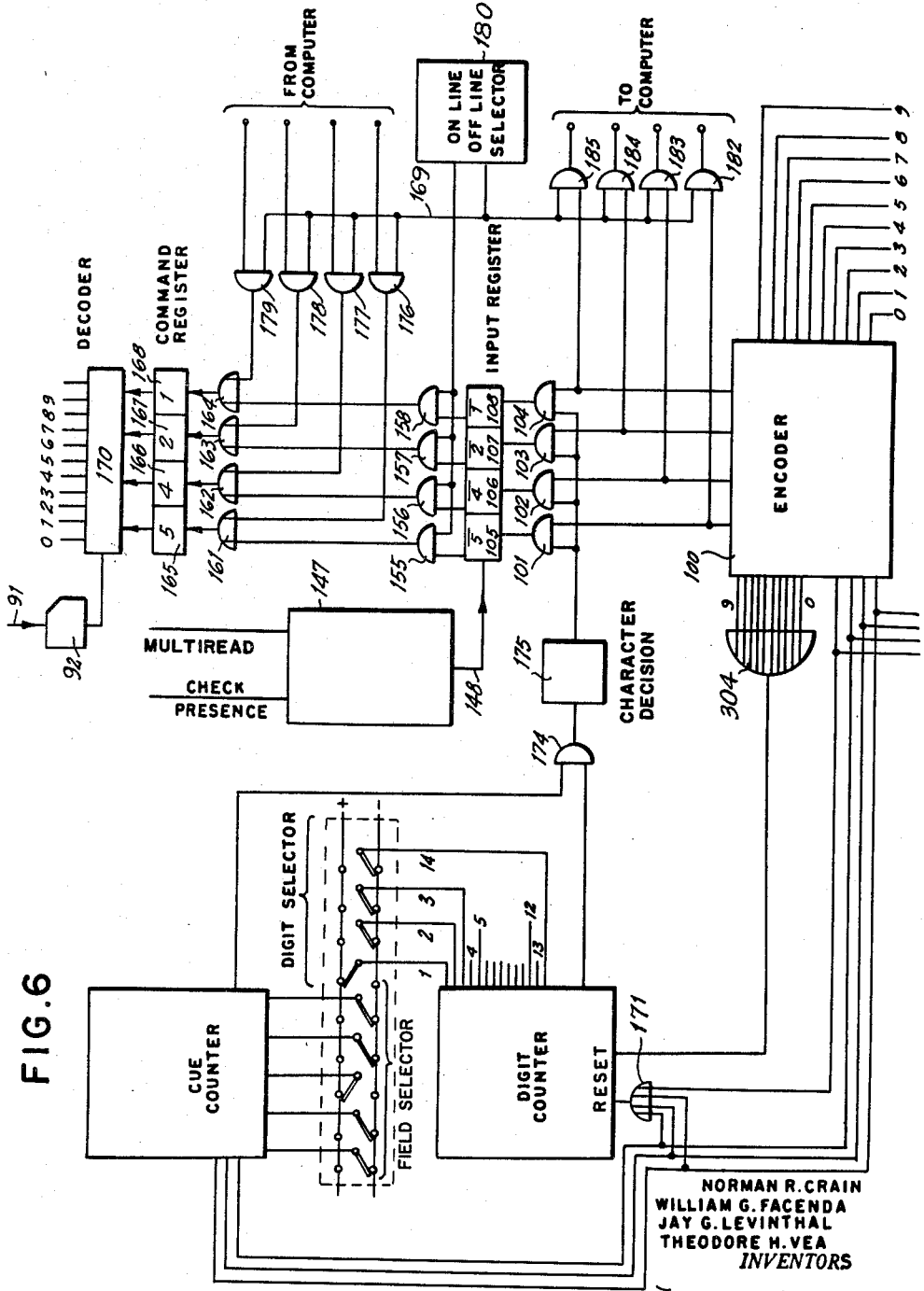
FIG. 6 shows in somewhat greater detail an outline of the sorter control.

FIG. 6 shows a functional block diagram of the Sorter Control represented by the rectangle bearing the legend Sorter Control in FIG. 1.

This figure shows an Encoder 100, which receives pulses over the lines 0 to 9 from the Character Reader and converts them to the $\bar{5}, \bar{4}, \bar{2}, \bar{1}$ system of the binary code. These pulses are supplied through AND gates 101 to 104 to flip flops 105, 106, 107, 108. These flip flops comprise an Input Register that functions as a buffer or storage register in which the bi-stable state of the different flip flops correspond to the values of the pulses received over the conductors 0 to 9.

At proper times the potentials at the output of these flip flops are transmitted through AND gates 155, 156, 157, 158 and OR gates 161, 162, 163, 164 to an output register referred to as the Command Register comprising flip flops 165, 166, 167 and 168 where the pulses are stored according to the 5, 4, 2, 1 system of the binary code.

At proper times determined by synchronizing pulses received from the inductor 87 of FIG. 1, through amplifier 90, conductor 91, and One Shot 92 of the Sorter Control to the Decoder 170 the pulses stored in the flip flops 165 to 168 are decoded by the Decoder 170 and supplied to conductors 0 to 9 and transmitted to the timer 15 of FIG. 1 thereby to control the deflectors 62–71 of the sorter of FIG. 1 in accord with the characters read by the Character Reader.

The timing of the output pulse from one shot 92 is so related to the position of the check in its travel as to provide the proper timing for the operation of the Special Sort deflector 61 without the necessity of passing this driving pulse through the timer 15.

The AND gates 101 to 104 are controlled by two counters, namely the "Cue Counter" and the "Digit Counter" which operate to close these AND gates to prevent the respective flip flops of the Input Register from receiving further pulses from the lines 0 to 9 until any numeral stored therein has been transferred to the Command Register. Similarly, AND gates 155 to 158 prevent numerals stored in the Input Register from being transferred to the Command Register while the Sorter Control is working "ON LINE" with the computer as will later be explained.

The Cut Counter receives the cue pulses through an OR gate 171 from the Character Reader. The Digit Counter receives the numeral pulses from conductors 0 to 9 through an OR gate 304 and is cleared by the presence of each cue character.

If a switch of the group disignated Field Selector corresponding to a particular field has been correctly adjusted to one of two positions the Cue Counter will respond to the cue corresponding to that field to supply a potential pulse, as indicated at 262 of FIG. 13, to the AND gate 174. If, at the same time, a switch of the Digit Selector corresponding to a particular digit has been adjusted to the proper one of its two positions to select a digit in the selected field then the Digit Counter also supplies potential pulses, as indicated by curve 256 of FIG. 13 to the AND gate 174. Thus both Input terminals of the AND gate 174 being properly energized during the pulse shown by curve 259 of FIG. 13 the flip flop 175 is operated to supply an appropriate negative potential, as shown by the left-hand portion of curve 260 of FIG. 13, to one input terminal of all of the AND gates 101 to 104, this potential being such that no further pulses from the Encoder are transmitted to the Input Register. Thus the last digit recorded in the Input Register is locked therein and that register is prevented from being further affected by the Encoder.

The flip flop 175 is referred to hereinafter as the Character Decision flip flop since it responds to selection of a desired digit in a selected field.

The Input Register is indicated as controlled also by equipment represented by rectangle 147. This comprises several controls, the detailed explanation of which will appear hereinafter in the description in respect to FIGS. 7, 8, 9 and 10, it being sufficient to state here that at the end of a check period, that is, about 70 milliseconds after the leading edge of a check passes the photo cell 57 in FIG. 1, a voltage is supplied over the Check Presence conductor of FIGS. 1 and 6 in response to which a voltage is supplied from equipment 147 over conductor 148 indirectly to the Input Register causing that register to transfer information stored therein to the Command Register at the proper time. Then upon receipt of a synchronizing pulse from inductor 87 of the Timer of FIG. 1 over conductor 91 and one shot 92, the flip flops of the Command Register are operated to transmit a pulse to one of the solenoids 60' to 69' of the timer to cause operation of one of the deflectors 62 to 71 corresponding to the numeral in the selected digit of the selected fileld of the last check read by the Character Reader.

As thus described, the operation is in accord with what is termed the "Off Line" mode. The rectangle 180 at the right of the diagram, FIG. 6, represents a selector which selects the mode of operation as either "Off Line" or "On Line." These terms On Line and Off Line have reference to operation of the Sorter Control—"Off Line"

with a computor or "On Line" with a computer. The drawing, FIG. 6, shows lines bearing the legend "To Computer" and which may extend to the input of an appropriate computer. It also shows lines bearing the legend "From Computer" which may extend to the output of this same computer.

The foregoing description has reference to "Off Line" operation. In that operation the equipment 180 supplies a potential over conductor 169 to one terminal of all of the AND gates 182, 183, 184 and 185, which prevents the transmission of pulses from the Encoder to the computer. At the same time this potential on conductor 169 is supplied to AND gates 176, 177, 178, 179 which prevents pulses from the computer from reaching the AND gates 161 to 164. Thus the direct channel from the Encoder to the Decoder remains operative and is not affected by the computer.

On the other hand, by proper manual adjustment of the "On Line"—"Off Line" Selector, a different potential may be supplied to conductor 169 which will cause pulses to be transmitted from the Encoder to the computer through AND gates 182 to 185 and which permits pulses from the computer to be transmitted through the AND gates 176 to 179 and OR gates 161 to 164 to the Command Register whereupon these pulses control the Sorter. In this way information printed in magnetic ink on the documents is transmitted to the computer which utilizes it in computing operations with which this application is not concerned and at the same time the sorter control may effect the desired collation herein described of the documents in response to commands from the computer.

TERMS USED

In the above and in what follows the terms "AND" gate, "OR" gate, "Flip Flop," are frequently used. These terms are used herein in the sense customary in the art, but before proceeding with a more detailed description of our invention these terms will be explained here as follows:

The term "AND" gate refers to a circuit of the type shown in FIG. 14, which comprises a plurality of diodes 111 and 112 having their anodes connected together and through a resistance 113 to a source of positive potential desginated +E, which may be 70 volts. The anodes are also connected to an output terminal 114.

The cathodes of these diodes are connected to respective input terminals 115 and 116, to which, in the circuits to be described, desired voltages, which may be either —5 or +5 volts with respect to ground, may be applied.

Diodes 111 and 112 have very low drop in potential between their anode and cathode. Therefore any cathode which has the most negative potential causes the current in resistance 113 to flow therethrough, and causes the voltage at the output terminal 114 to assume substantially the potential of said most negative cathode. Therefore, so long as any cathode is negative, positive potential applied to any other input terminal has no effect. The output terminal is rendered positive only by rendering all the input terminals positive. Thus to change the output from negative —5 to +5 volts all of the input potentials must be +5. However, the output may be changed from +5 to —5 volts by supplying —5 volts to any anode.

In the system to be described the cathodes of these diodes, and most other control potentials, will be in the neighborhood of either —5 or +5 volts, or voltages in that general range but, of course, any desired voltages may be used.

The term "OR" gate, unless otherwise indicated, refers to a circuit of the kind shown in FIG. 15, and which involves a plurality of diodes 121 and 122 having their cathodes connected together and to an output terminal 123, and also, through a resistance 124 to a source of negative potential E, which may be —70 volts. The anodes of the respective diodes 121 and 122 are connected to input terminals 125 and 126. Here again very small voltage drop appears across any diode. Therefore current can flow only from the most positive anode to the negative side of the source E, thereby cutting off all other diodes. The output potential becomes the potential of the most positive anode.

To make output 123 negative all inputs must be negative. If any input is positive the output at 123 is positive.

The AND and OR functions have been described in terms of a signal convention in which the presence of a signal is represented by a positive going voltage. Inversion of this convention to make a negative going excursion representative of a signal inverts the AND and OR functions.

The term "Flip Flop" as used herein refers to a bistable multivibrator comprising a pair of transistors which are rendered alternately conducting. When either transistor is conducting, it automatically renders the other non-conducting.

The collector of the non-conducting transistor is negative and the collector of the conducting transistor is positive. These collector potentials—negative and positive—are transmitted to output terminals through amplifiers to produce on one of the output terminals 146 a positive voltage of 5 volts when the flip flop is said to be "ON" or "HIGH" and on the other terminal 144 a negative voltage of —5 volts. When these voltages are reversed the flip flop is said to be "OFF" or "Low."

The flip flop circuit commonly used in our invention is shown in FIG. 16. It comprises the transistors 126 and 127, each having a base electrode B, collector electrode C, and an emitter electrode E. The base electrodes of the two transistors are connected to corresponding points on voltage dividers 131, 132, 133, and 136, 137, 138 across the power source +E, —E. The collectors are also connected to corresponding points on the voltage dividers at more negative potential than the base electrodes. The emitters are connected to a source of positive voltage indicated as +V which may be +8 volts. Outline representation of diodes is used in this figure to indicate a germanium diode, while the solid representation of a diode indicates the use of a silicon diode, characterized by higher forward drop than the germanium diode.

As thus far described, current normally flows from the positive +8 volt source through the emitter of one, or the other of the two transistors, thence through the base electrode and collector to the —70 volt terminal of the source through either resistance 133 or 138.

If we assume that the current is flowing through the transistor 126 and resistance 138, the potential on resistance 138 will increase, thereby rendering the base electrode of transistor 127 positive with respect to the emitter of that transistor, thereby rendering the transistor 127 non-conducting and reducing the current in resistance 133 and causing the potential at point 140 to vary in the negative direction. The potentials of the points 140 and 141 are supplied through transistor amplifiers 145 and 143, respectively, and appear, in amplified form, at output terminals 146 and 144, respectively.

Transistor 126 may be rendered non-conducting by applying a suitable positive voltage to the terminal 149. In our system this is done by applying a positive voltage of 5 volts to terminal 149 and a trigger pulse of 10 volts through condenser 150 to the base electrode. Of course, in any situation where the voltage applied at 149 or 271 is high enough and properly timed to trigger the flip flop the trigger pulse is unnecessary.

When transistor 127 is conducting, it can be turned off by supplying a five volt positive signal to terminals 149' or 272, supplemented by a trigger pulse at the input of capacitor 150', or by supplying a signal of greater positive magnitude to terminal 149' or 272 without the necessity for a supplemental trigger pulse. Where a pulse of such greater magnitude is desired, the common emitter amplifier 505 of FIGURE 19 may be employed, utilizing a transistor 500 with its emitter connected to V₃ of minus 5 volts, its base connected with input terminal 501 through resistance 502, and its collector connected with +E of +70 volts through resistance 503. The circuit parameters are so chosen that the application of a negative five volt input signal at terminal 501 produces a positive 9 volt excursion of the collector which is then applied to the desired load.

The number and variety of inputs to the flip flop of FIGURE 16 afford considerable flexibility in its circuit applications. If the potential applied to the terminals 149, 271, 149′ or 272 are suitably restricted, the flip flop is prepared for later response to the application of a trigger pulse to one or both capacitors 150, 150′, whereas if those potentials are applied through an amplifier such as 505 of FIGURE 19, the flip flop may be changed in state without the auxiliary presence of trigger pulses.

The term "One Shot" as used herein, is a circuit usually employing two transistors connected in a circuit having a stable state and an unstable state. In either state the output voltage has desired magnitude and polarity for the respective state. The device is normally in its stable state but upon receipt of a desired pulse it changes condition to the unstable state for an interval pre-determined by the circuit. Upon expiration of the interval the circuit returns to its stable state.

THE SORTER CONTROL—DETAILS

FIGS. 7, 8, 9 and 10 arranged together, according to the plan shown in FIG. 11, with the lines extending from one page to another in alignment, show in greater detail the circuits more schematically indicated in FIG. 6.

The Encoder of FIG. 6 and the AND gates 101, 102, 103, and 104 are shown in FIG. 10 in which each AND gate is comprised of two AND gates, one for setting the flip flops of the Input Register to one of their two conditions and the other for resetting them to the original condition.

Figure 9:
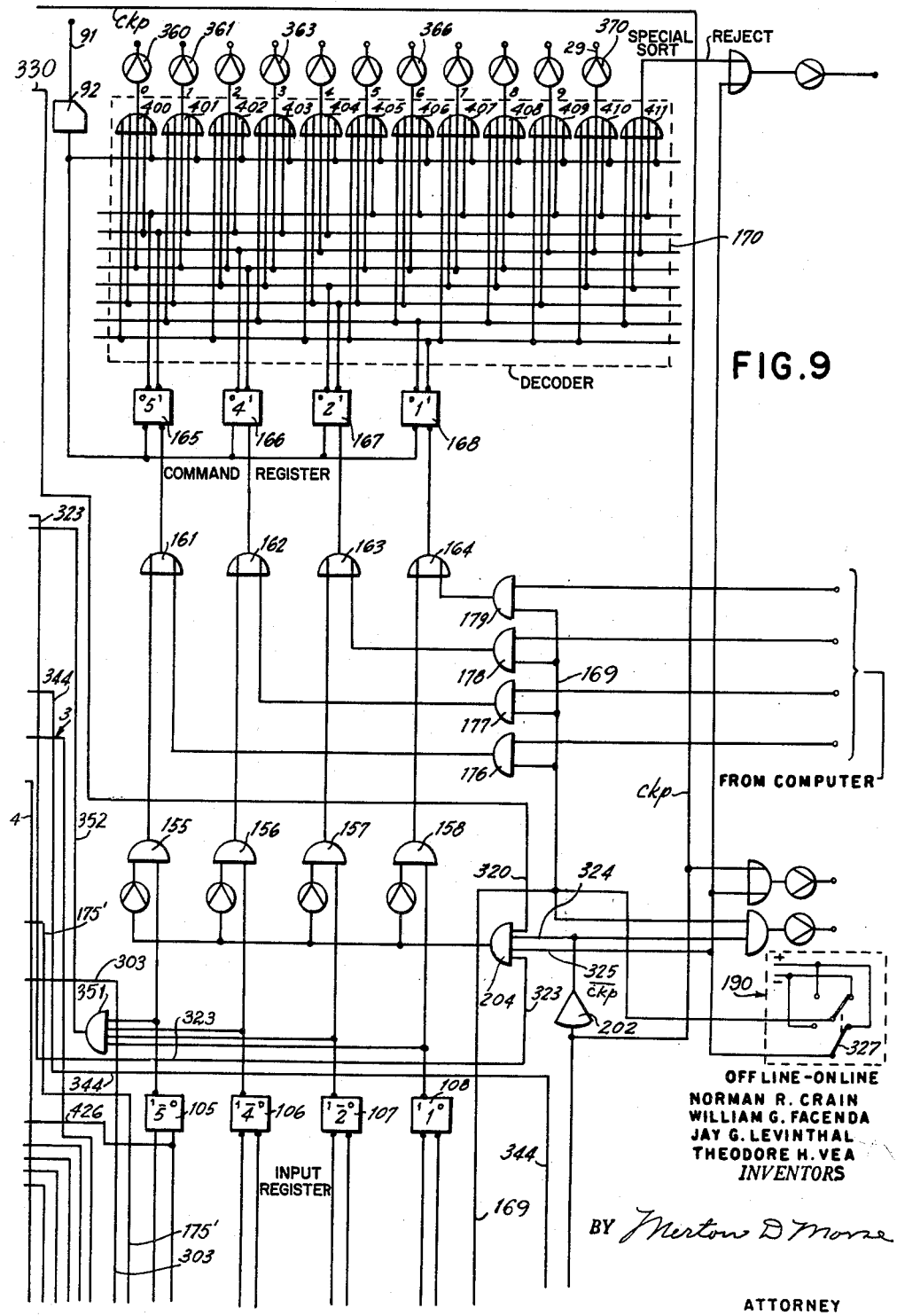

The Input Register, and the Command Register, together with the Decoder and various AND gates are shown in FIG. 9. The Digit Selector and the Field Selector are shown at the top of FIG. 7, the Field Selector being connected more particularly with the Cue Counter which comprises the flip flops 233, 263, 264, and 265 in FIG. 8. The Digit Selector is shown in FIG. 7 including the Digit Counter more particularly represented by the flip flops 222, 223, 224, and 225.

The various equipment represented by the rectangle of 147 of FIG. 6 is represented mainly in FIG. 8.

A more detailed description of these circuits and of their operation now follows:

As the check enters at point 20 on FIG. 1 the check presence signal is activated by interruption of the light to the cell 57 and thereafter the various cue characters and digits pass underneath magnetic head 54 and are read by the Character Reader producing corresponding pulses on the output cue conductors and output digit conductors leading from the Character Reader to the Sorter Control.

The first character read is a cue character which is used to reset the Digit Counter flip flops 222, 223, 224, and 225 in FIG. 7. This is done by passing the currents in the cue conductors which are shown at 242, 243, 244, and 245 in FIG. 8 through the OR gate 171, conductor 257, inverter 258, amplifier 259 such as that illustrated in FIGURE 19 and conductor 261 to the reset sides of all of the flip flops of the digit counter.

As the numerical digits, enter the Sorter Control on conductors 0–9 at the bottom of FIG. 10 they are encoded in the diode encoding matrix 100 into the $\bar{5}$, $\bar{4}$, $\bar{2}$, $\bar{1}$ code and are supplied to the Input Register. The pulses transmitted through AND gates 101S, 102S, 103S, and 104S set each of their respective flip flops 105, 106, 107, 108 in the Input Register and those transmitted through AND gates 101R, 102R, 103R, 104R reset the Input Register flip flops 105, 106, 107, and 108, respectively. A common term to these AND gates is a voltage furnished over a bus 175′ derived from the Character Decision flip flop 175, known as the "Character Decision" flip flop. At the time of Character Decision, that is, when the Digit Counter and the Cue Counter have responded to the desired digit for which the Digit and Field Selectors have been set, AND gate 174 turns on the Character Decision flip flop 175, and in turn makes negative the voltage on the aforementioned bus 175′ which bus was previously positive, to permit registering in the Input Register the numerals coded in the input encoder. As this voltage on bus 175′ becomes negative all further information from the Character Reader emanating from the Digit Encoder 100 is blocked from entering the Input Register by AND gates 101S to 104R. Thus the flip flops of the Input Register are thereafter unaffected by the Encoder and the digit occurring at the time of character decision is stored therein.

This information stored in the Input Register is transferred to the Command Register, which is comprised of flip flops 165, 166, 167, 168 at the end of the check presence period wave form 201, FIG. 12. The check presence wave form shown at 201 in FIG. 12 comprises a positive pulse generated in the Character Reader in response to wave form shown at 200 in FIG. 12, the latter of which is the differentiated output of photo cell 57 of FIG. 1. The further details of the transfer of information from the Input Register to the Command Register are set forth below under the heading "End of Check—Transfer from Input Register to Command Register."

To illustrate in more detail, suppose the "1" conductor from the Character Reader of FIG. 1, which enters the Digit Encoder 100 at the "1" terminal of FIG. 10 carries a pulse, this pulse is transferred through OR gates 213, 215, 217 and 220. These pulses, in turn, pass through AND gates 101S, 102S, 103S and 104R, since conductor 175′ is positive, and put the Input Register in the state corresponding to "1," i.e. flip flops 105, 106, 107 "ON" and 108 "OFF." The truth table, according to which the Input Register 105, 106, 107 and 108 operates, is as follows:

| Corresponding State of Input Register | | | | Numeral Stored |
|---|---|---|---|---|
| Flip Flops | $\bar{5}$ 105 | $\bar{4}$ 106 | $\bar{2}$ 107 | $\bar{1}$ 108 | |
| | 0 | 0 | 0 | 1 | Special Sort |
| | 1 | 1 | 1 | 1 | 0 |
| | 1 | 1 | 1 | 0 | 1 |
| | 1 | 1 | 0 | 1 | 2 |
| | 1 | 1 | 0 | 0 | 3 |
| | 1 | 0 | 1 | 1 | 4 |
| | 0 | 1 | 1 | 1 | 5 |
| | 0 | 1 | 1 | 0 | 6 |
| | 0 | 1 | 0 | 1 | 7 |
| | 0 | 1 | 0 | 0 | 8 |
| | 0 | 0 | 1 | 1 | 9 |

Thus the quantity 1 is stored in the Input Register.

Assuming the next digit after the abovementioned "1" is an "8," OR gates 214, 215, 218, and 220 pass the pulse through AND gates 101R, 102S, 103R, and 104R and destroy the 1110 stored there as a result of the previous digit character "1" and replaces this with 0100 which is set up by the "8."

This process continues each successive digit destroying the previous digit information in the Input Register and replacing it with its own until the Cue Counter and Digit Counter have completed their counting and determined the numeral to be held in the Input Register. Then flip flop 175, which is controlled by the two abovementioned counters, supplies a negative voltage over conductor 175′ to AND gates 101S, 101R, 102S, 102R, 103S, 103R, 104S, 104R, thereby preventing further pulses being transmitted from the coder to the Input Register.

To understand how the desired sorting in the selected field is arrived at, i.e. the digit for which the switches of the Digit and Field Selectors have been set, consider the digit counter, FIG. 7.

The Digit Counter counts all digit characters emanating from the Character Reader. Pulses corresponding to the digits 1 to 9 are transmitted thereto through OR gate 172, emitter follower 302, conductor 4, OR gate 304, and conductor 254 to all of the flip flops 222 to 225 of the Digit Counter.

Pulses corresponding to the zero digit are transmitted thereto over conductor 303, OR gate 304, emitter follower 307, conductor 254 and emitter follower 308 to the flip flops 222 to 225. The reason for transmitting the zero digit over conductor 303, separate from digits 1 to 9, appears below under the heading "Significant and Insignificant Zeros."

The Digit Counter, composed of flip flops 222, 223, 224, 225, is a self-gated shift register. The first stage of the counter flip flop 222 is self-complementing except while the last flip flop 225 is on. That is to say, flip flop 222 will continue to turn on and off with each pulse counted until the last flip flop 225 goes on. Because AND gates 374 and 375 are respectively connected with the inputs 149 and 149′ of drive flip flop 222, and since both are tied to the zero output of flip flop 225, when 225 goes "ON" the first flip flop 222 cannot change state. The zero output terminal of flip flop 225 is connected to an input terminal of each of AND gates 374 and 375. The other input terminal of AND gate 374 is connected to a 0 output terminal of the first flip flop 222. The other input terminal of AND gate 375 is connected to the 1 output terminal of the first flip flop 222. These connections mechanize the "ON" then "OFF" nature of the first flip flop 222 as long as 225 is "OFF."

All of the cue pulses are supplied through OR gate 171, FIG. 8, conductor 257, inverter 258, amplifier 259, and conductor 261, as positive pulses, to the reset terminal 271 (see FIG. 7) of each flip flop, making that terminal momentarily positive and causing all the flip flops to be reset to the "0" state so that the "1" output terminal is low (−5 volts) and the 0 output terminal of all the flip flops is high (+5 volts).

The digit pulses are supplied as positive pulses to the trigger pulse input TP (see FIG. 7) of all the flip flops. These digit pulses then "turn on" any flip flop having its "set" terminal (see FIG. 7) connected to a terminal which is at positive potential such as the output of a previous flip flop or a gate. And conversely, these digit pulses acting as trigger pulses turn any flip flop "OFF" whose reset terminal is high. Any flip flop already "OFF" when the reset terminal is high remains "OFF."

Thus when the first digit pulse arrives on line 254 it finds all of the flip flops off and its effect is to turn the flip flop 222 on because its set terminal is high. This places a positive voltage on conductor 282 of matrix 283.

When the second digit pulse arrives it turns off flip flop 222 because its reset terminal is connected to the output of AND gate 375 which is high, and it turns on flip flop 223 because its set terminal is high. Thus positive voltage is removed from conductor 282 and applied to conductor 284.

Similarly, the third digit pulse turns off flip flop 223 and turns on flip flop 222 and 224, thereby removing positive voltage from conductor 284 and applying positive voltage to conductors 282 and 285.

Likewise, the fourth pulse turns off flip flops 222 and 224 and turns on flip flops 223 and 225, thereby removing positive voltage from conductor 285 and 282 and supplying positive voltage to conductor 286 and 284.

Now the AND gates 374 and 375 are turned off, now supplying negative voltage to the set and reset terminals of flip flop 222 and holding flip flop 222 in its then state, which is off. This flip flop cannot change state as long as flip flop 225 is on.

This operation then continues for successive pulses, the operation being in accord with the following truth table.

| No. of Digit Pulse | Flip Flops | | | |
|---|---|---|---|---|
| | 225 | 224 | 223 | 222 |
| Reset | 0 | 0 | 0 | 0 |
| 1 | 0 | 0 | 0 | 1 |
| 2 | 0 | 0 | 1 | 0 |
| 3 | 0 | 1 | 0 | 1 |
| 4 | 1 | 0 | 1 | 0 |
| 5 | 0 | 1 | 0 | 0 |
| 6 | 1 | 0 | 0 | 1 |
| 7 | 0 | 0 | 1 | 1 |
| 8 | 0 | 1 | 1 | 0 |
| 9 | 1 | 1 | 0 | 1 |
| 10 | 1 | 0 | 1 | 0 |
| 11 | 0 | 1 | 1 | 1 |
| 12 | 1 | 1 | 1 | 0 |
| 13 | 1 | 1 | 0 | 0 |
| 14 | 1 | 0 | 0 | 0 |

FIG. 7 shows 14 AND gates 226 to 239. This number is chosen in accord with the maximum number of digits in any field on the documents to be collated. Each of these AND gates have five input terminals, four of which are connected to vertical conductors in the matrix 283, the potential of which is controlled by the digit counter and a fifth of which is connected to a respective one of fourteen switches, such as a switch 253 of the Digit Selector. These switches have two positions, a Normal, or lower, position, as shown on the drawing, in which negative voltage is supplied to the respective AND gate and a Select, or upper, position, as shown on the drawing, in which positive voltage is supplied to the AND gate. Thus no pulse is supplied through any AND gate except one corresponding to a switch operated to the Select position.

The connections of the flip flops 222 to 225, the conductors of matrix 283, the gates 226 to 239 and the OR gate 255, are such that the output of the OR gate becomes positive only after the number of digit pulses received by the Counter corresponds to the Digit Selector switch that is operated from its normal position to its Select position.

Positive voltage from the output of OR gate 255 is supplied over conductor 292, emitter follower 292′, conductor 293, to one input of AND gate 174, another input terminal of which is connected to the output of the Cue Counter which will now be described.

The cue character pulses are supplied over conductors 242, 243, 244 and 245, each designated at lower left hand corner of FIG. 8 by a respective symbol.

The first cue character pulse to occur corresponds to the number sign at the beginning of the dollar amount field. Since no sorting is contemplated in this field, this cue character is not supplied to the Cue Counter.

The next cue character to be read is the asterisk at the beginning of the Transaction field. This pulse is supplied over conductor 244, emitter follower 294, conductor 229, emitter follower 232, to the set terminal of the flip flop 233 so that the flip flop will turn on when it is triggered by a trigger pulse repetitively applied from a source (not shown).

The Cue Counter comprises flip flops 233, 265, 264 and 263, shown in the upper portion of FIG. 8. These flip flops are initially reset during the time that no check appears before the magnetic read head, i.e. during the positive portion of the wave 203 of FIG. 12. This wave is supplied to the reset terminal of each of these flip flops from the check presence conductor CKP of FIGS. 10, 9 and 8 through reset amplifier 293 of the type shown in FIG. 19 and conductor 294. The cue pulses are shown in FIG. 13 at 226, 227, 228 in the curve 221.

Flip flops 233 and 263 have trigger pulses applied to their condensers 150 and 150′ (FIG. 16) through means not shown, insufficient to trigger the flip flop except during positive pulses on their input terminals 149 or 149′ (FIG. 16), such trigger pulses occurring at a rate high enough to have a period short by comparison with the expected duration of the cue pulses, i.e. a trigger pulse period of about 4 microseconds with an anticipated cue pulse duration of 20 microseconds.

TRANSACTION CODE FIELD

When triggered, as by the asterisk pulse at the beginning of the Transaction Code Field, which pulse is supplied thereto over conductor 244, emitter follower 294, and conductor 229, flip flop 233 supplies positive voltage over conductor 295 to one terminal and AND gate 296, the other input terminal of which may be supplied with positive voltage over conductor 297 from a switch 298 of the Field Selector corresponding to the Transaction Code Field, if sorting is desired in that field.

The positive voltage, if sorting is desired in the Transaction Code Field, is supplied from AND gate 296 through OR gate 261 and conductor 305, emitter follower 305', to AND gate 174, OR gate 315 to the Character Decision flip flop. The mid terminal of AND gate 174 is normally positive except when sorting in the after hyphen portion of the Account Number Field as explained below under the heading "After Hyphen—Before Hyphen Sorting in the Account Number Field." The flip flop 175 supplies negative voltage over the conductor 175' to block all of the AND gates 101S to 104R so that sorting is in accord with the numeral stored in the Input Register by the digit corresponding to the operated switch of the Digit Selecor.

ACCOUNT NUMBER FIELD

To sort in the Account Number Field, as can be seen from FIG. 2, both the asterisk and French door pulses are supplied to the Cue Counter. The French door pulses are supplied over conductors 242 and 302' to the flip flops 264 and 265 of the Cue Counter. As previously indicated, since sorting is not desired in the Dollar Amount field the first cue pulse is not supplied to the cue counter.

The first French door pulse is supplied to the trigger pulse terminals TP of flip flop 264 and 265. This sets the flip flop 264 but it does not set the flip flop 265 because its set terminal is negative.

These two flip flops, connected as shown, comprise a counter which operates in accord with the following truth table:

| Pulse on Conductor 302 [1] | State | | |
|---|---|---|---|
| | 265 | 264 | |
| 0 | 0 | 0 | |
| 1 | 0 | 1 | Account Number—AND gate 266. |
| 2 | 1 | 0 | Routing—AND gate 267. |
| 3 | 1 | 1 | End of Check—AND gate 268. |

All terminals indicated are high after the pulse noted in the left-hand column. The table indicates that the AND gate 266 is connected to the "1" terminal of flip flop 264 and "0" terminal of flip flop 265 and that AND gates 267 and 268 are connected as similarly indicated in the truth table.

After the first French door pulse the "1" output terminal of flip flop 264 is positive and this potential is supplied to conductor 306 of the matrix 307. This conductor 306 is connected to one terminal of AND gate 266, the other input terminal of which is connected to the "0" output terminal of flip flop 265 which is high. Therefore, both input terminals being high, positive voltage is supplied through AND gate 266 to one terminal of AD gate 276, the other input terminal of which is supplied with positive voltage over conductor 309 from switch 312 of the Cue Selector if that switch is in engagement with its positive contact, as when sorting is desired in the Account Number field. This positive voltage is supplied through OR gate 261 and conductor 305 to AND gate 174 and Character Decision flip flop as before.

This same pulse at the output of AND 266 is also supplied over conductor 313 to the reset terminal of flip flop 233 to reset that flip flop. This terminates the Account Number field.

SORTING IN LAST DIGIT OF TRANSACTION CODE FIELD

It is desirable in sorting in the Transaction Code field to have a quick way to effect sorting in the last digit of that field. To this end a special switch bearing the legend TR2 is provided in the Cue Selector to operate, similarly with the other switches, to supply a positive voltage over conductor 314 to one terminal of AND gate 269. The other terminal of this AND gate 269 is connected to the output of AND gate 266 which goes positive in response to the first French door, i.e. the next cue pulse. The output of AND gate 269 is supplied through OR gate 315 to the Character Decision flip flop 175.

Therefore, to sort in the last digit of the Transaction Code Field, it is only necessary to operate switch TR2 to its positive position and documents will be sorted according to numerals apearing in the last digit of the Transaction code, the equipment then responding to those numerals as stored in the Input Register.

The character decision flip flop 175 supplies a negative voltage over conductor 175' to one terminal of all of the AND gates 101S to 104R, thereby preventing further pulses from being supplied to the Input Register. Sorting is, therefore, in accord with the pulses of the last digit recorded in the Input Register without utilizing the Digit Counter.

AFTER HYPHEN—BEFORE HYPHEN, SORTING IN THE ACCOUNTING NUMBER FIELD

In the Account Number Field the digits following the hyphen may correspond to the bank branch in which the account is held, whereas the digits prior to the hyphen identify the particular account. It is desirable to sort checks in the digits following the hyphen thereby to collate all checks of a particular branch. To do this it is necessary to disassociate the account identifying digits of the Account Number from the branch identifying digits. Otherwise the collating of checks of a particular bank would be adversely affected by the varying number of digits in the account identifying portion of the account number.

Therefore, a switch identified BH-AH (before hyphen—after hyphen) is provided in the Field Selector which normally supplies positive voltage over conductor 315, OR gate 271, conductor 316 to AND gate 174 for sorting in the Before Hyphen portion of the account number field. This switch, in its normal position, also supplies positive voltage to this terminal of AND gate 174 for sorting in other fields.

For sorting in the After Hyphen portion of the account number field, the switch BH-AH is operated to its negative position, as shown, thereby supplying negative voltage to OR gate 271, rendering conductor 316 and the corresponding input to AND gate 174 negative until the hyphen is reached.

The hyphen pulse is supplied over conductor 317, emitter follower 372, to one input of AND gate 275, the other input of which is connected by conductor 306 to the output of OR gate 261 and is therefore positive whenever the account number button is operated to the positive position and the first french door pulse has occurred. Therefore, positive voltage is supplied to the set terminal of hyphen flip flop 263, turning that flip flop on and rendering its "1" output terminal positive, thereby supplying positive voltage through OR gate 271, and conductor 316 to AND gate 174.

When the Account Number switch 312 is in its positive position conductor 309 is positive throughout all digits of the account number field and terminal 293 of AND gate 174 becomes positive when the digit is reached corresponding to the switch of the Digit Selector that is operated. Then, when conductor 316 becomes positive, as has been described, the character decision flip flop is triggered, closing the gates 101S to 104R as before described. Sorting now takes place in accord with the numeral in the selected digit of the After Hyphen portion of the account number field.

ROUTING FIELD SORTING

To sort in the Routing field, the switch in the Field Selector designated "Routing" is operated to its positive position to supply positive voltage over conductor 318 to one input terminal of AND gate 277. The other input terminal is connected to the output of AND gate 267, the two input terminals of which are connected to conductors 319 and 320 of matrix 307.

The operation which occurs in response to the first French door has been explained, i.e., positive voltage is supplied over conductor 302' to the trigger pulse terminal TP of flip-flop 264, thereby causing that flip flop to change state. Thus the first French door pulse does not affect AND gate 267.

In response to the second French door pulse, the flip flop 264 is turned off and flip flop 265 is turned on, thereby rendering positive both conductors 319 and 320 of the matrix, and both input terminals of AND gate 267. This positive voltage is supplied through AND gate 277, OR gate 261, conductor 305, AND gate 174, OR gate 315 to the set side of Character Decision flip flop 175. Thereafter sorting in the Routing field takes place as in other fields.

END OF CHECK

*Transfer From Input Register to Command Register*

When the third French door pulse occurs the Cue counter is stepped to its third step where, as shown by the truth table, both input terminals of AND gate 268 are connected to the "1" terminals of flip flops 264 and 265, and those terminals are high, i.e. positive. This positive voltage is supplied through OR gate 322, conductor 330 to one input of AND gate 204.

This AND gate 204 has four inputs and its output controls AND gates 155, 156, 157 and 158 through which information is transferred from the Input Register to the Output Register. This can only occur when four conditions are satisfied which render all of the four inputs to AND gate 204 positive.

The occurrence of the third French door corresponding to the end of the check is one of those conditions and renders one terminal positive.

Sometimes documents are collated bearing the format shown in FIG. 17 having only one French door. It is therefore also desirable that this same input terminal of AND gate 204 be rendered positive in response to the first French door. This is effected by connecting the lower input terminal of OR gate 322 to the output terminal of AND gate 266 which is positive after the first French door.

The three other conditions which must be satisfied before information is transferred from the Input Register to the Command Register are (1) that a character decision must have been made by flip flop 175, (2) the equipment must be operating "OFF LINE," and (3) the check presence pulse must be terminated.

From what has been said before the flip flop 175 has been operated and its output conductor 323 is positive. This conductor 323 is connected directly to the lower input terminal of AND gate 204.

Input terminal 324 of AND gate 204 is connected to the output of inverter 202, the input of which is connected with the check presence conductor CKP. The voltage on the check presence conductor is designated CKP in FIG. 12 and at the output of the inverter is indicated as the $\overline{CKP}$, the positive portion of which occurs between checks. Thus after termination of the check this terminal 324 is positive.

The fourth input terminal 325 of AND gate 204 is connected to positive voltage through switch 326 in the Off-Line On-Line selector.

Therefore since all four input terminals of AND gate 204 are positive, all of the AND gates 155, 156, 157, 158, are open and transmit voltages from the outputs of the Input Register to the Command Register.

COMMAND REGISTER OPERATION

*Decoder and Command to Timer and Sorter*

The last digit transferred from the Input Register to the Command Register is stored therein according to the following truth table:

| Output Conductor | 5 | 4 | 2 | 1 |
|---|---|---|---|---|
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 1 | 0 | 0 | 0 |
| 6 | 1 | 0 | 0 | 1 |
| 7 | 1 | 0 | 1 | 0 |
| 8 | 1 | 0 | 1 | 1 |
| 9 | 1 | 1 | 0 | 0 |
| Special Sort | 1 | 1 | 0 | 1 |
| Reject | 1 | 1 | 1 | 0 |

Referring to FIG. 9, the gates 400 to 411 have their outputs connected to the output conductors 0 to 9, Special Sort and Reject respectively and their inputs connected to selected conductors represented by horizontal lines in matrix 170, different pairs of which are connected to the 0 and 1 output terminals of the flip flops 165 to 168, these connections being so made that transfer of potential from the flip flops 165 to 168 to the output conductors 0 to 9, Special Sort, and Reject, is in accord with the above truth table. Owing to the use of negative signal representations, the gates 400 to 411 serve as OR gates to energize a single conductor, the internal configuration being represented by that of FIGURE 15.

This transfer of potential occurs only in response to an order from the Timer in the form of a synchronizing pulse from inductor 87 over conductor 91 to one shot 92 indicating that the Timer is in condition to receive the output from the Command Register. This synchronizing pulse is indicated by the curve 91 in FIG. 12.

The output potential of one shot 92 is indicated by curve 92 of FIG. 12. It is positive except for a brief negative pulse after each synchronizing pulse from line 91. The normally positive output from the one shot 92 is supplied to one input terminal of all gates in the matrix 170, holding all outputs 0 to 9, Special Sort and Reject positive and preventing transfer of potential from the output of the flip flops 165 to 168 except during the negative one shot pulses of the curve 92. Then any output of flip flops 165 to 168 that is positive has its potential supplied to such of the output conductors 0 to 9, Special Sort and Reject as are connected thereto through any of the gates 400–411, permitting only the single selected conductor to become negative.

The potentials operate through the Timer to control the deflectors of the Sorter and direct the documents to the proper pockets.

SPACE DETECTION

In what has gone before, it has been assumed that the indicia printed on the check are distinct and properly readable by the Character Reader. In the practice of our invention, however, it occasionally occurs that a digit may be missing, printed with insufficient clearness to produce an adequate response by the Character Reader, or the character may be deformed so that it does not produce any response at all.

It is desirable that checks in which such printing occurs be directed to the Reject pocket or to the Special Sort pocket of the Sorter, dependent upon whether the space detected by the equipment is one that is improper, (not in accordance with the format used)—or is one that is proper (in accord with format).

In order to detect spaces of this character, the alarm flip flop 325 (FIG. 8) is provided, which is operated in response to occurrence of such a space whether it be proper or improper. Equipment to be described later and to which the output of flip flop 325 is supplied distinguishes between proper and improper spaces.

The input to this flip flop 325 is derived through AND gate 324, having six inputs, two of the inputs of which are controlled by one shots 319 and 322.

This flip flop 325 together with one shots 322 and 319 are sometimes referred to herein as the "space detector."

OR gate 321 receives pulses corresponding to all cue symbols and digit numerals. Cue pulses are supplied thereto from OR gate 171, FIG. 8, over conductor 257. The digit pulses are supplied thereto through OR gate 304, one of the inputs of which receives the 1 to 9 pulses over conductor 4 from OR gate 172 and the other of which receives the zero pulse over conductor 303.

The output of OR gate 321 is indicated by the curve 321 of FIG. 18, the pulses of which include all cue and digit pulses. These pulses are supplied through emitter follower 415 to one shot 322, the output of which is shown by curve 322 in FIG. 18.

From the curve 322, FIG. 18, it will be seen that the normal output of one shot 322 is positive but that it is triggered to its unstable condition by pulses of curve 321 during which its output is negative for a period of about 500 microseconds. This interval is shorter than the interval between the pulses of curve 321 by approximately 333 microseconds. At the end of this 500 microseconds interval the output of the one shot returns to its normal positive condition by reason of its own circuit constants.

This return of the output 322 in a positive condition triggers the second one shot 319, the output curve of which is shown at 319 FIG. 18. The output of one shot 319 is differentiated by differentiator 418 to produce the pulses of curve 418 of FIG. 18. This differentiator produces positive pulses at its output when curve 419 goes positive but produces no output when it goes negative. The output of one shot 322 and differentiator 418 are supplied to the AND gate 324 thereby assuring that the output of AND gate 324 is negative from the time of the first cue pulse through the period in which the second pulse would normally occur. The positive differentiation by differentiator 418 eliminates the possibility of AND gate 324 becoming positive at time 419.

If a pulse from the Character Reader is not produced in response to scanning of a particular digit, as is indicated at the point 416 of FIG. 18, for example, then the one shot 322 is not triggered to its negative condition at that time, but remains positive. The output of the AND gate 324 becomes positive at the end of the 500 microsecond negative pulse of the one shot 319 as indicated at the point 417 of FIG. 18 due to the positive pulse from differentiator 418. At that time the output from the alarm flip flop 325 becomes positive as indicated at 422, provided other conditions represented by other input terminals of the AND gate 324 are satisfied.

These other conditions are as follows: (1) that sorting is in a desired field other than the Transaction code field, which is assured by the connection of the zero output of asterisk flip flop 233 over conductor 326 to a third input of AND gate 324. This zero output is low, or negative, during sorting in the Transaction Field. The above connection prevents the operation of the alarm flip flop 325 when sorting in that field. The space detector never operates in the transaction code field whether the equipment is ON LINE or OFF LINE.

(2) The second condition is that a character decision has not been made by flip flop 175. The output of the "0" side of Character Decision flip flop 175 is connected through conductor 175' to a fourth input of the AND gate 324.

(3) The third condition is that the Sorter Control of FIGS. 7 to 10 is operating OFF LINE, which is assured by negative potential supplied from the OFF LINE, ON LINE selector 190 over conductor 169 through OR gate 395 in FIG. 8 to a fifth input of AND gate 324. When this conductor 169 is high during ON LINE operation the space detector will be enabled during the complete format (except the Transaction code field). When the selector 190 is on "OFF LINE" position, the gate 395 provides a positive input to the AND gate 324 whenever OR gate 261 supplies a positive output indicating that the desired field has been located.

(4) The fourth condition is that the output of the OR gate 271 shall be positive, indicating that either the Before Hyphen-After Hyphen Switch 270 is in its positive position or that a Hyphen in the Account Number field has set the flip flop 263.

Thus any space which appears on the document in a field other than the Transaction Field, but not before the hyphen if sorting on the bank designation in which sorting is effected, whether proper or improper, operates the alarm flip flop 325 if no character decision has been made. It still remains to determine whether the space is proper or improper.

The output from alarm flip flop 325 is supplied to the input of two AND gates 341 and 331, which control respectively the Reject conductor 344 and the Special Sort conductor 3.

In addition any operation of the alarm flip flop 325 triggers the Character Decision flip flop 175 through conductor 419 and OR gate 315. The operation of the Character Decision flip flop 175, of course, as has been previously described, renders conductor 175' negative and blocks all further tranmsission of energy pulses to the Input Register.

The AND gate 331 has two input terminals, one connected to the output of the alarm flip flop 325 and the other connected through conductor 257 to the cue OR gate 171 whereby all cue pulses are supplied to the AND gate 331.

The positive potential supplied by alarm 325 to AND gates 341 and 331 remains to the end of the field on the check on which a space occurred. Therefore, if a subsequent digit on the check occurs after the space and before the end of the field, a digit pulse will appear at the output of OR gate 304 and is supplied over conductor 349 to the other input of gate 341. The output of this gate then becomes positive indicating that the space is an improper space. This positive voltage is supplied over conductor 344, OR gate 425, conductor 426 to OR gates 332, 333, 334 and 336 to set up in the Input Register the numerals 0 0 0 0. This condition of the Input Register, when transferred to the Command Register, and read out produces no response, i.e. no deflector 61 to 71 is operated, and the check on which the improper space appears is passed into the Reject pocket of the Sorter.

If on the other hand the next character read by the Character Reader is a cue, then a cue pulse appears at the output of OR gate 171 and is supplied over conductor 257 to the other terminal of AND gate 331 causing its output terminal to be positive indicating that the space is a proper one. This positive voltage is supplied through OR gate 363, conductor 3, and OR gates 332, 333, 334 and 335, to the set terminal of flip flop 108 and the reset terminal of flip flop 105, 106 and 107. This sets up a configuration in the Input Register which when transferred to the Command Register and read out from the Decoder, energizes conductor 29 of FIG. 1, causing the deflector 61 to be lifted, opening the Special Sort pocket to the check on which the proper space appeared.

Either condition of the Input Register which results in deposit of a check into the Reject pocket or the Special Sort pocket as the result of a space, either proper or improper, on a check simultaneously resets the alarm flip flop 325 by potential supplied over conductor 426' as the Input Register is being put into such condition.

SIGNIFICANT AND INSIGNIFICANT ZEROS

The recording of a zero in the Input Register during sorting does not necessarily mean that the document on which the zero appeared should be deposited in the zero pocket. This is because the zero may not be significant on the document. That is, it may be one such as those shown in the last three digits following the first French door in FIG. 17. The significant number in that field is 109. The zero of the second digit in this field is significant and in sorting on that digit the document should be deposited in the zero pocket. In sorting on the 4th, 5th or 6th digit the document should be deposited in the Special Sort pocket.

To effect this selection between the significant and insignificant zeros the AND gates 351 of FIG. 9, and 353 and 362 of FIG. 8 are provided. The AND gate 351 senses the zero, that is the 1111 configuration, in the Input Register and supplies positive voltage to one terminal of AND gates 353 and 362 over conductor 352.

In searching in a particular digit the Character Decision flip flop operates in response to any character in the selected digit to supply positive voltage over conductor 323 to respective inputs of AND gates 353 and 362.

Now, if the zero is insignificant it will be followed by a numeral 1 to 9 before the next cue character. The 1 to 9 pulses are supplied through OR gate 172 and conductor 4 to AND gate 353 but not to AND gate 362. AND gate 353 now becomes positive, turning flip flop 361 on supplying negative voltage over conductor 492 to AND gate 362 thereby to prevent that AND gate from becoming positive as it would do were the zero an insignificant zero. The conditions are now satisfied by which the document bearing the significant zero in a digit on which sorting is effected, is deposited in the pocket corresponding to zero.

If no numeral from 1 to 9 occurred flip flop 361 would supply positive voltage over its "0" conductor 492 to AND gate 362 leaving that gate capable of being turned on by a positive voltage on its remaining input 493 which is connected over conductor 257 to the output of OR gate 171 to which all cue characters are supplied. When such a cue character is received AND gate 362 becomes positive and supplies positive voltage through OR gate 363, conductor 3 to OR gates 332, 333, 334 and 335 thereby setting up conditions in the Input Register necessary to deposit the document in the Special Sort pocket.

MULTIREAD

It sometimes happens that because of improper printing, or possible malfunction of the Character Reader, a single digit may produce a response on two output conductors of the Character Reader. This may be referred to as a multiread. The above referred to application Serial No. 783,350 of Merritt and Steele show means whereby the outputs of all of the conductors of the Character Reader are supplied to a summing amplifier and thence through a threshold device. The output of the summing amplifier exceeds the threshold established by the threshold device to produce an output pulse only in case of such a multiread. This output pulse may be used to actuate an alarm. In accord with our invention, it may be supplied to the input terminal shown in FIG. 10 bearing the legend "Multiread." This pulse passes OR gate 425 and OR gates 332, 333, 334 and 336 to the Input Register where it sets up the Reject configuration which results in the document being deposited in the Reject pocket if the character decision flip flop 175 has been set.

COMMAND REGISTER PRESET

After the Command Register has issued its pocket command to the Timer and Sorter it is desired to preset it to the 1111, or Reject configuration. This is done by supplying the output of one shot 92, which is of the form of curve 92 of FIG. 12, to the clock pulse input TP (see FIG. 16) of all of the flip flops of the Command Register thereby preparing that Register for receipt of new information from the Input Register.

The time sequence of events is illustrated in FIG. 12 where the vertical dash line at the end of the positive pulses 201 of the check presence wave CKP corresponds to the time when the Input Register transfers its information from the last check to the Command Register. Before this time occurs the Command Register must have issued its command and been reset to receive the new configuration from the Input Register. During the negative pulse of curve 92 the Command Register is read out to the Timer and Sorter and at the end of this pulse all of its flip flops are preset to the "1" condition whereby it is in condition to receive a new configuration.

Although the use of a magnetic entry notation on the information bearing document has been specifically treated in this description of the invention, it is contemplated and known that other visible notations may be used in which the outline or general shape of the configuration has a visual significance to the observer corresponding to the information represented thereby, appropriate scanning and translating apparatus being used.

While the invention has been described in terms of an embodiment based upon specific examples of components useful in the logical processing of information, viz. diodes, flip flops, transistors, resistances, etc., it is pointed out that components based upon the utilization of other physical phenomena may also be employed in similar logical arrangements, as, for example, vacuum tubes, magnetic amplifiers, in addition to other active devices and storage elements, depending upon specific application and environmental problems. Thus, while we have shown a particular embodiment of the invention, it will of course be understood that we do not wish to be limited thereto, since many modifications both in the circuit arrangements and the instrumentalities employed may be made. We contemplate by the appended claims to cover any such modifications as fall within the true spirit and scope of our invention.

What we claim as new and desire to secure by Letters Patent of the United States is as follows:

1. In a collator for documents, each document having a plurality of groups of numerals printed thereon, each group being preceded by a symbol, and the numerals being in digital order, a scanner, a plurality of pockets, a conveyor for conveying said documents past said scanner and pockets in succession whereby said symbols and numerals are scanned in the order in which they pass the scanner, said scanner having individual output circuits for each symbol and each numeral, and means responsive to each symbol and numeral to produce a pulse in the corresponding output circuit, storing means to receive said pulses, said storing means having different potential configurations within it, each configuration corresponding to the particular output circuit over which the pulse was received, a control for said pockets, said control including means to select a predetermined digit in a predetermined group and to supply the pulse produced by said digit to said storing means to set up a corresponding potential configuration therein, said means including means responsive to failure of the selected digit to produce a pulse in said output to set up a different potential configuration in said storing means, means responsive to a pulse subsequent to said failure produced by a group symbol to set up a third potential relationship in said storing means, and means to control said pockets in accord with the potential configuration in said storing means.

2. In a collator for documents, each document having a plurality of groups of numerals printed thereon, each group being preceded by a symbol, and the numerals being in digital order, a scanner, a plurality of pockets, a conveyor for conveying said documents past said scanner and pockets in succession, whereby said symbols and numerals are scanned in the order in which they pass the scanner, said scanner having individual output circuits for each symbol and each numeral, and means responsive to each symbol to produce a pulse in the corresponding output circuit, storing means to receive said pulses, said storing means having different potential configurations within it, each configuration corresponding to the particular output circuit over which the pulse was received, a control for said pockets, said control including means to select a predetermined digit in a predetermined group and to supply the pulse produced by said digit to said storing means to set up a corresponding potential configuration therein, said means including means responsive to failure of the selected digit to produce a pulse in said output to set up one or another different potential configurations within said storing means dependent upon whether said failure is followed by a pulse produced by a subsequent numeral or a subsequent symbol, and means to control said pockets in accord with the potential configurations set up in said storing means.

3. In a collator for documents, each document having a plurality of groups of numerals printed thereon, each group being preceded by a symbol, and the numerals being in digital order, a scanner, a plurality of pockets, a conveyor for conveying said documents past said scanner and pockets in succession whereby said symbols and numerals are scanned in the order in which they pass the scanner, said scanner having individual output circuits for each symbol and each numeral, and means responsive to each symbol and numeral to produce a pulse in the corresponding output circuit, storing means to receive said pulses, said storing means having different potential configurations within it, each configuration corresponding to the particular output circuit over which the pulse to be stored was received, a control for said pockets, said control including means to select a predetermined digit in a predetermined group and to supply the pulse produced by said digit to said storing means to set up a corresponding potential configuration therein, said means including means responsive to pulses in two or more of said conductors to set up a potential configuration in said storing means corresponding to a multireading of the respective document, and means responsive to said last configuration to route said document producing said multiread to a respective one of said pockets.

4. In a collator of documents, each document bearing a plurality of groups of indicia of a first class, each group being preceded by an indicia of a second class, wherein said documents are sequentially read and sorted into different repositories in accord with indicia thereon, the combination of a first group of channels provided with signals representative of symbols of said first class read from a given document, a second group of channels provided with signals representative of symbols of said second class read from said given document, each signal in said second group of channels occurring in advance of a corresponding group of signals in the first group of channels, a storage register, means to register signals from said first group of conductors in succession in said storage register, means responsive to a predetermined signal in the second group of channels and a predetermined number of signals thereafter in the first group of channels to retain in said storage register the signal from said first channel last stored therein notwithstanding occurence of further signals in said first group of channels, and means coupled to said storage register for sorting said given document in a repository in accord with the signal last stored in said register.

5. In a collator of documents, each document bearing a plurality of groups of indicia of a first class, each group being preceded by an indicia of a second class, wherein said documents are sequentially scanned and sorted into different repositories in accord with indicia thereon, the combination of a first group of channels provided with signals representative of symbols of said first class scanned on a given document, said signals occurring in succession, a second group of channels provided with signals representative of signals of said second class scanned on said given document, each signal in said second group occurring in advance of a corresponding group of signals in the first group of channels, scanning means to derive said signals from symbols borne by documents scanned in succession by said scanning means, a storage register, means to register signals in said first group of channels in succession in said storage register, means responsive to a predetermined signal in the second group of channels and a predetermined number of signals thereafter in the first group of channels to retain in said register the signal from said first channels last stored therein until scanning of the document from which said signals are derived is completed, a second storage register, means to register in said second storage register the condition of said first storage register and to recondition said first storage register to register signals derived from a document next scanned by said scanning means, and means for sorting said given document in a repository in accord with the condition registered in said second register.

6. In a collator of documents, each document bearing a plurality of groups of indicia of a first class, each group being preceded by an indicia of a second class, wherein said documents are sequentially scanned and sorted into different repositories in accord with indicia thereon, the combination of a first group of channels provided with signals representative of symbols of said first class scanned on a given document, said signals occurring in succession, a second group of channels provided with signals representative of symbols of said second class scanned on a given document, each signal in the second group of channels occurring in advance of a group of signals in the first group of channels, scanning means to derive said signals from symbols borne by said given document, a storage register, means to register signals in said first group of channels in succession in said storage register, means responsive to a predetermined signal in the second group of channels and a predetermined number of signals thereafter in the first group of channels to retain in said register the signal from said first channels last stored therein until scanning of the document from which said signals are derived is completed, a second storage register, and means to register in said second storage register the condition of said first storage register and to recondition said first storage register to register signals dederived from a document next scanned by said scanning means, a plurality of output channels each corresponding to one of said input channels, and means responsive to termination of scanning of each document to produce a signal in the output circuit corresponding to the signal registered in said second register in response to which said given document is deposited in a repository in accord with the condition registered in said second storage register.

7. In a collator of documents, each document bearing a plurality of groups of indicia of a first class, each group being preceded by an indicia of a second class, wherein said documents are sequentially scanned and sorted into different repositories in accord with indicia thereon, the combination of a first group of channels provided with signals representative of symbols of said first class scanned on a given document, said signals occurring in succession, a second group of channels provided with signals representative of signals of said second class scanned on said given document, each signal in said second group of channels occurring in advance of a corresponding group of signals in the first group of channels, scanning means to derive said signals from symbols borne by documents scanned in succession by said scanning means, a storage register, means to register signals in said first group of channels in succession in said storage register, means responsive to a predetermined signal in the second group of channels and a predetermined number of signals in the first group of channels to retain in said register the signal from said first channels last stored therein until scanning of the given document from which said signals are derived is completed, a second storage register, and means to register in said second storage register the condition of said first storage register and to recondition said first storage register to register signals derived from a document next scanned by said scanning means, a plurality of output channels each controlling the routing of documents scanned by said scanning means, and means responsive to termination of scanning of each document to produce a signal in one of said output channels corresponding to the signal registered in said second register in response to which said given document is deposited in a repository in accord with the condition registered in said second storage register.

8. In a collator of documents, each document bearing a plurality of control symbols scanned in succession to produce corresponding signals, the combination comprising: a storage register, a plurality of input, and a plurality of output channels, each input and a corresponding output channel corresponding to a respective symbol, said input channels being adapted to convey signals at regular intervals to said register, the signals in each channel representing the corresponding symbol, means responsive to a predetermined number of signals in said input channels to interrupt conveyance of further signals to said register and to produce a signal in that one of said output channels corresponding to the symbol represented by the signal last registered in said register, means coupled to said storage register for collating each of said documents in accord with the signal last registered in said register for each document, and means responsive to a time interval greater than normal between signals in said input channels to interrupt conveyance of signals from said input channels to said register, and means responsive to the occurrence of a subsequent signal in said input channels to set up in said storage register a condition identified with said greater interval, whereby a document being scanned when a time interval greater than normal between signals occurs in said input channels is collated in accord with the condition setup in said storage register which is identified with said greater interval.

9. In a collator of documents, each document bearing a plurality of control symbols scanned in succession to produce corresponding signals, the combination comprising: a storage register, a plurality of input, and a plurality of output channels, each input and a corresponding output channel corresponding to a respective symbol, said input channels being adapted to convey signals at regular intervals to said register, means responsive to a predetermined number of signals in said input channels to interrupt conveyance of further signals to said register and to produce a signal in that one of said output circuits corresponding to the symbol represented by the signal last registered in said register, means coupled to said storage register for collating each of said documents in accord with the signal last registered in said register for each document, means responsive to a time interval greater than normal between signals in said input channels to interrupt conveyance of signals from said input channels to said register and upon occurrence of a subsequent signal in said input channels to set up in said storage register a condition identified with said greater interval, means responsive to a subsequently occurring symbol representing signal in one of said input channels to control the character of said condition, and means responsive to said condition to control said output circuits, whereby a document being scanned when a time interval greater than normal between signals occurs in said input channels is collated in accord with the condition setup in said storage register which is identified with said greater interval.

10. In a collator of documents, each document bearing a plurality of control symbols scanned in succession to produce corresponding signals, the combination comprising a storage register, a plurality of input, and a plurality of output channels, each input and a corresponding output channel corresponding to a symbol of a first class and said input channels carrying pulses at regular intervals to said register representing said symbols, an additional input channel carrying pulses representing signals of a second class, an additional output channel, means coupled to said storage register for collating each of said documents in accord with the signal last registered in said register for each document, means responsive to a predetermined number of signals in said input channels to interrupt conveyance of signals from said input channels to said register and to produce a pulse in that one of said output channels corresponding to the symbol represented by the last signal conveyed to said register, and means responsive to an interval greater than normal between signals in said input channels to stop conveyance of further signals from said input channels to said register and to set up in said register either of two conditions dependent on whether the next to occur signal represents a signal of the first or second class, whereby a document being scanned when a time interval greater than normal between signals occurs in said input channels is collated in accord with the condition setup in said storage register which is identified with said greater interval.

11. In a collator of documents, each document bearing a plurality of control symbols scanned in succession to produce corresponding signals, the combination comprising: a storage register, a plurality of input, and a plurality of output channels, each input and a corresponding output corresponding to symbols of a first class and said input channels carrying signals representing said symbols at regular intervals to said register, an additional input channel carrying signals representing symbols of a second class, an additional output channel, means responsive to a predetermined number of signals in said input channels to interrupt conveyance of signals from said input channels to said register and to produce a signal in that one of said output channels corresponding to the symbol represented by the last signal conveyed to said register, means coupled to said storage register for collating each of said documents in accord with the signal last registered in said register for each document, means responsive to an interval greater than normal between signals in said input channels to stop conveyance of further signals from said input channels to said register, and means responsive to subsequent occurrence of a signal representative of a signal of the second class to set up a special condition to said register, and means responsive to said special condition to supply a signal to said additional output channel, whereby a document being scanned when a time interval greater than normal between signals occurs in said input channels is collated in accord with the condition setup in said storage register which is identified with said greater interval.

12. In a collator of documents, each document having printed thereon a plurality of groups of indicia of a first class, each group being preceded by an indicia of a second class, a scanning device, a conveyor to convey said documents in succession past said scanning device whereby said indicia on the different documents are scanned in succession, a plurality of repositories, each corresponding to a respective indicia of said first class, additional repositories, means responsive to a predetermined number of indicia of the first class passing said scanning device after a predetermined indicia of the second class to deposit each document scanned in the repository corresponding to the character of the indicia that constituted the last of said predetermined number, and means responsive to a time interval longer than normal between indicia scanned that produced proper response in said scanning device to deposit the document producing said longer time interval in one or another of said additional repositories, dependent on whether the next indicia scanned is of the first class or second class.

13. In a collator of documents, each document having a plurality of groups of symbols of a first class, each group being preceded by a symbol of a second class, and one of said groups being divided by a distinctive symbol, a scanning device arranged to scan in succession the symbols on said documents, said device including a group of channels carrying signals representing symbols scanned of said first class, a group of channels carrying signals representing symbols scanned of the other of said classes, means to select a symbol of the second class, means to count the signals received from said first group of channels until a predetermined number of signals of the first class have been received after a signal has been received representing said selected symbol, a storage register, means to convey said signals representing symbols of the first class to said register, means to interrupt said conveyance in response to receipt of said predetermined number of signals thereby to retain in said register the signal last conveyed thereto, a plurality of repositories each corresponding to a symbol of the first class, means to deposit each document in a repository corresponding to a symbol represented by the signal last conveyed to said register, means to disable said interrupting means, means responsive to a signal representative of said distinctive symbol to enable said interrupting means whereby said interrupting means is disabled except after a signal representative of said distinctive symbol is received, whereby documents are deposited in said repositories according to signals in said storage register representative of symbols of the first class in the portion of said one group after said distinctive symbol.

14. In a collator for documents, each document having a plurality of symbols printed thereon, a scanning device to scan the symbols in succession on each of said documents, said device having an output circuit for each of said symbols and means responsive to each symbol to produce a signal in the respective output circuit, a storage register, means to supply said signals in succession to said register, means to count said signals and to interrupt said last means after a predetermined count, a plurality of repositories for said documents, each corresponding to a respective symbol and an additional repository, means to deposit said documents in the respective repository corresponding to the symbol represented by the signal stored in said register when said count is reached, and means responsive to signals occurring simultaneously in any two of said circuits to deposit the respective document in said additional repository.

15. In a collator of documents, each document having printed thereon a plurality of groups of indicia of a first class, each group being preceded by an indicia of a second class, a scanning device, a conveyor to convey said documents in succession past said scanning device whereby said indicia on the different documents are scanned in succession, a plurality of repositories, each corresponding to a respective indicia of said first class, an additional repository, means responsive to a predetermined number of indicia of the first class passing said scanning device after a selected indicia of the second class to deposit each document scanned in the repository corresponding to the character of the indicia that constituted the last of said predetermined number, means responsive to a time interval longer than normal between indicia scanned that produced proper response in said scanning device to deposit the document producing said longer time interval in said additional repository, and means to disable said last means when indicia are scanned in a group following a different selected indicia.

16. In a document sorter, each document having printed thereon a plurality of groups of indicia, each group being preceded by a symbol of the respective group, one group identifying a transaction code, and another an account number, a scanning device, a conveyor for conveying said documents past said scanning device whereby said indicia and symbols on the different documents are scanned in succession, a plurality of repositories, each corresponding to a respective indicia, an additional repository, means responsive to each indicia in a predetermined position in a selected group on each document scanned to deposit each document in the repository corresponding to the indicia in said predetermined position, means responsive to failure of any indicia in said predetermined position of the selected group on any document to produce proper response in said scanning device to deposit the document bearing said indicia in said additional repository, and means to prevent operation of said last means in response to selection of the transaction code group.

17. In a collator of documents, each document bearing a plurality of control symbols scanned in succession to produce corresponding signals, the combination comprising: a storage register, a plurality of input, and a plurality of output channels, each input and a corresponding output channel corresponding to a symbol of a first class and said input channels carrying pulses at regular intervals to said register representing said symbols, an additional input channel carrying pulses representing signals of a second class, an additional output channel, means responsive to a predetermined number of signals in said input channels to interrupt conveyance of signals from said input channels to said register and to produce a pulse in that one of said output channels corresponding to the symbol represented by the last signal conveyed to said register, means coupled to said storage register for collating each of said documents in accord with the signal last registered in said register for each document, means responsive to an interval greater than normal between signals in said input channels to stop conveyance of further signals from said input channels to said register and to set up in said register a condition identified with said longer interval, whereby a document being scanned when a time interval greater than normal between signals occurs in said input channels is collated in accord with the condition setup in said storage register which is identified with said greater interval; and means to prevent operation of said last means when the last symbol of the second class to precede said longer interval is of a predetermined character.

18. In a collator for documents, each document having a plurality of groups of symbols printed thereon, each group of symbols of a first type being preceded by a symbol of a second type, a scanning device, a conveyor for conveying said documents past said scanning device whereby said symbols are scanned in succession, said scanning device having an individual output circuit for each different symbol of the first type, and means responsive to each symbol for producing a pulse in a corresponding output circuit, a plurality of repositories along said conveyor, each repository corresponding to one of said output circuits, an off-line control means for said repositories, said control means including means for selecting a predetermined ordinal symbol of the first type in a predetermined group as defined by at least one symbol of the second type, a first register, an encoder coupling each individual output circuit to said first register and said group of transmission channels, means for selectively enabling said group of transmission channels for on-line operation, means responsive to said predetermined symbol of the first type to retain in said register signals from said encoder last stored therein until scanning of the document from which said signals are derived is completed, a second storage register, means coupling said second storage register to said first register and responsive to said off-line control means for transferring to said second register the coded signals in said first storage register when scanning of the document from which said signals are derived is completed, a group of receiving channels adapted to be connected to a computer, means for selectively enabling said group of receiving channels for on-line operation and for disabling said means coupling said first storage register to said second storage register, whereby said second storage register receives coded signals from said first storage register during off-line operation and from said computer during on-line operation, a plurality of output channels each corresponding to one of said output circuits, a decoder coupling said output channels to said second register, and means responsive to termination of scanning of each document to produce a signal in the output channel corresponding to the signal registered in said second register in response to which said given document is deposited in a repository in accord with the coded signals registered in said second storage register regardless of whether the mode of operation selected is on-line or off-line.

19. In a collator for documents, each document having a plurality of symbols of a class of symbols printed thereon, said numerals being in digital order on said document, the combination of: a reader for reading said symbols in succession, said reader having an individual reader output circuit for each symbol of said class of symbols, said reader including means responsive to each symbol read to produce a signal in a corresponding reader output circuit; an input register; an encoder circuit connected between the reader output circuits and said input register and operable in response to a signal in a reader output circuit to set up a configuration in said input register representative of the symbol corresponding to said reader output circuit; a control circuit selectively operable to retain in said input register the configuration produced therein by the symbol in a selected digital order; a command register; means operable after the reading of the symbols on said document to set up a configuration in said command register corresponding to the configuration retained in said input register; a decoder circuit connected to said command register, said decoder circuit having an individual decoder output circuit for each symbol of said class of symbols, said decoder circuit being operable to produce a signal in the decoder output circuit coresponding to the configuration in said command register; a plurality of receptacles for said documents, one for each symbol of said class of symbols; and means controlled by the signal from said decoder circuit for depositing the document bearing the symbol which produced said signal in the corresponding receptacle.

20. In a collator for documents, each document having a plurality of symbols of a class of symbols printed thereon, said symbols being in digital order on said document, the combination of: means for receiving a document; a reader for reading the symbols on said document in succession, said reader having an individual reader output circuit for each symbol of said class of symbols, said reader including means responsive to each symbol read to produce a signal in a corresponding reader output circuit; an input register; an encoder circuit connected between the reader output circuits and said input register and operable in response to a signal in a reader output circuit to set up a configuration in said input register representative of the symbol corresponding to the signal from said reader output circuit; additional means operable to transmit signals from said encoder to a computer; a control circuit selectively operable to retain in said input register the configuration produced therein by the symbol in a selected digital order; a command register; means normally operable after the reading of the symbols on said document to set up a configuration in said command register in response to the configuration retained in said input register; means to alternatively set up a configuration in said command register corresponding to signals received from a computer; a decoder circuit connected to said command register, said decoder circuit having an individual decoder output circuit for each symbol of said class of symbols, said decoder circuit operable to produce a signal in the decoder output circuit corresponding to the configuration in said command register; a plurality of receptacles, one for each decoder output circuit; and means controlled by the signal from said decoder circuit for depositing said document in the corresponding receptacle.

References Cited in the file of this patent

UNITED STATES PATENTS

| | | | |
|---|---|---|---|
| 2,000,403 | Maul | May 7, | 1935 |
| 2,254,931 | Bryce | Sept. 2, | 1941 |
| 2,257,220 | Becker | Sept. 30, | 1941 |
| 2,293,500 | Fox | Aug. 18, | 1942 |
| 2,531,874 | Dean | Nov. 28, | 1950 |
| 2,592,202 | Smith | Apr. 8, | 1952 |
| 2,798,216 | Goldberg | July 2, | 1957 |
| 2,804,974 | Noon | Sept. 3, | 1957 |
| 2,830,285 | Davis et al. | Apr. 8, | 1958 |
| 2,911,624 | Booth | Nov. 3, | 1959 |
| 2,913,171 | Phelps | Nov. 17, | 1959 |
| 2,924,812 | Merritt | Feb. 9, | 1960 |
| 2,944,735 | Goldstern | July 12, | 1960 |
| 2,951,234 | Spielberg | Aug. 30, | 1960 |
| 2,961,649 | Eldredge | Nov. 22, | 1960 |
| 2,994,428 | Daubendick | Aug. 1, | 1961 |

FOREIGN PATENTS

| | | | |
|---|---|---|---|
| 750,422 | Great Britain | June 13, | 1956 |